(12) United States Patent
Sakata et al.

(10) Patent No.: US 7,599,174 B2
(45) Date of Patent: Oct. 6, 2009

(54) DISPLAY DEVICE

(75) Inventors: Tatsuya Sakata, Tokyo (JP); Makoto Miyashita, Tokyo (JP); Toyoki Takahashi, Kanagawa (JP); Daiki Adachi, Kanagawa (JP); Sachiko Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/125,170

(22) Filed: May 22, 2008

(65) Prior Publication Data

US 2008/0291613 A1   Nov. 27, 2008

(51) Int. Cl.
G06F 1/16 (2006.01)
(52) U.S. Cl. .................... 361/679.27; 248/425
(58) Field of Classification Search .......... 248/159, 248/425; 361/670.05, 679.06, 679.21, 679.27, 361/679.29
See application file for complete search history.

(56) References Cited

U.S. PATENT DOCUMENTS

| 6,081,969 | A | 7/2000 | Tanahashi et al. |
| 6,189,602 | B1 | 2/2001 | Tanahashi et al. |
| 2003/0184961 | A1* | 10/2003 | Ahn .......................... 361/683 |
| 2008/0290239 | A1* | 11/2008 | Sakata et al. ................. 248/425 |
| 2008/0291615 | A1* | 11/2008 | Sakata et al. ................. 361/681 |
| 2008/0315048 | A1* | 12/2008 | Sakata et al. ................. 248/159 |

FOREIGN PATENT DOCUMENTS

| JP | 11-101049 | 4/1999 |
| JP | 11-102235 | 4/1999 |
| JP | 2000-349465 | 12/2000 |
| JP | 2002-196333 | 7/2002 |
| JP | 2006-227427 | 8/2006 |
| JP | 2006-227513 | 8/2006 |
| JP | 2006-235424 | 9/2006 |
| JP | 2006-251791 | 9/2006 |
| JP | 2006-293322 | 10/2006 |

* cited by examiner

*Primary Examiner*—Hung V Duong
(74) *Attorney, Agent, or Firm*—Finnegan, Henderson, Farabow, Garrett & Dunner, L.L.P.

(57) ABSTRACT

A display device includes a display panel; a substrate arranged at a lower part of a rear surface of the display panel, and mounted with an electronic component for functioning the display panel; hinge plates, arranged at a rear surface of the substrate so as to cover at least one part of the substrate or the electronic component, for holding the display panel and diffusing heat of the substrate or the electronic component; and a supporting shaft arranged extending at a lower part of the display panel and turnably coupled with the hinge plates with respect to a center axis. A display device capable of efficiently releasing heat of the substrate mounted with electronic components can be provided.

5 Claims, 19 Drawing Sheets

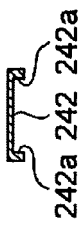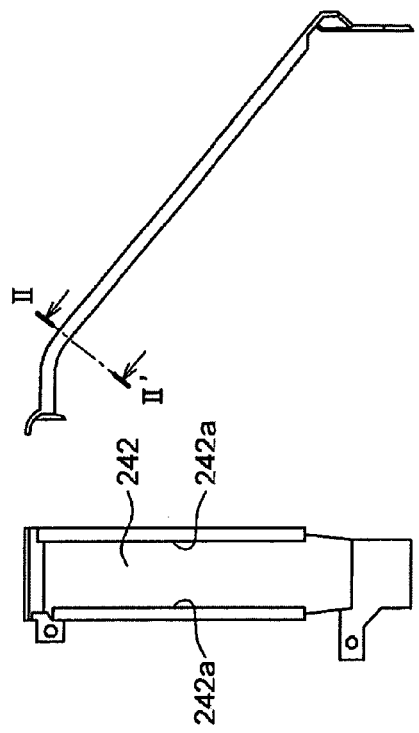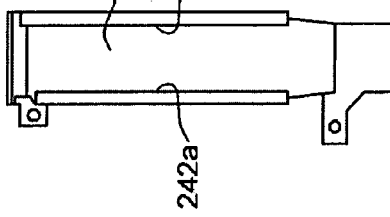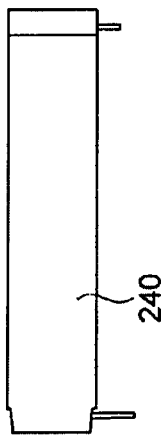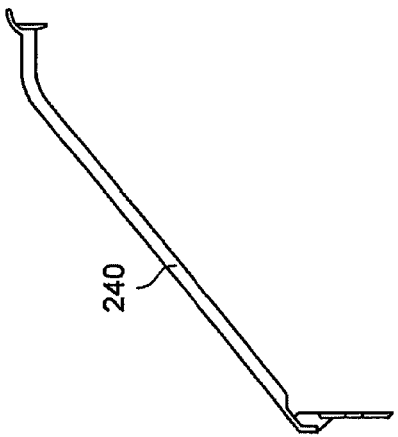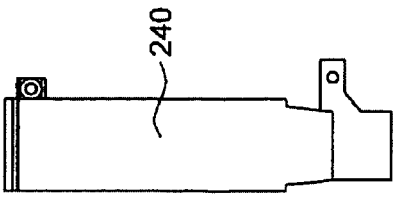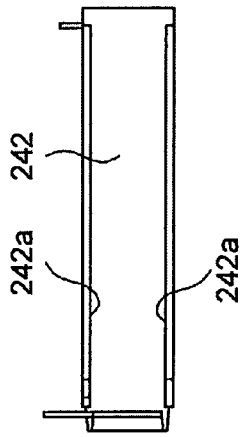

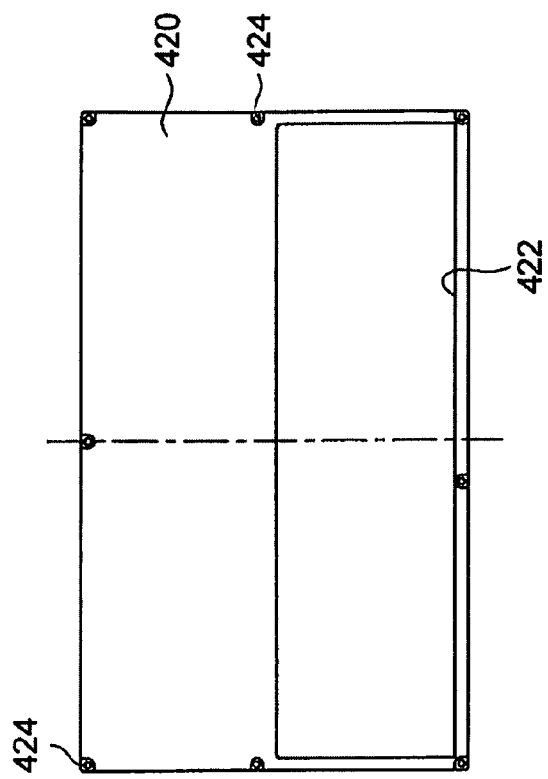
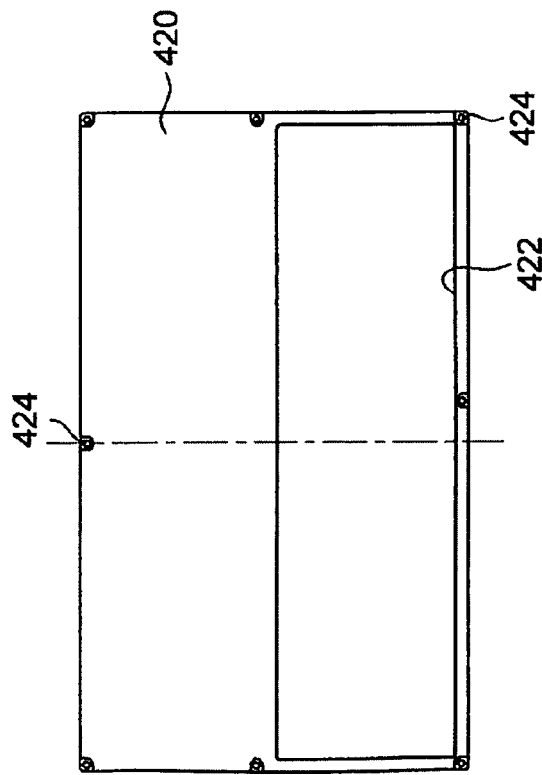

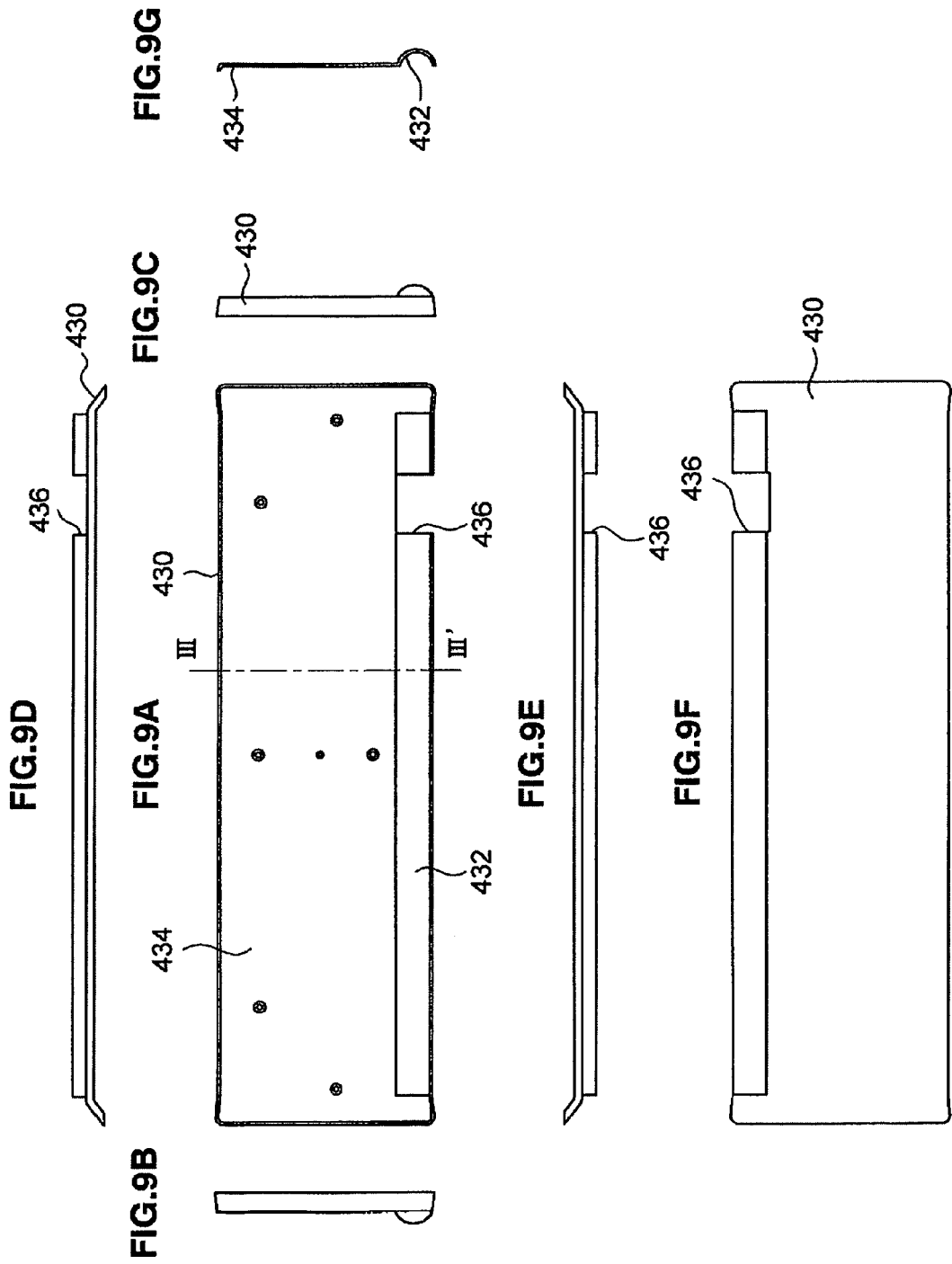

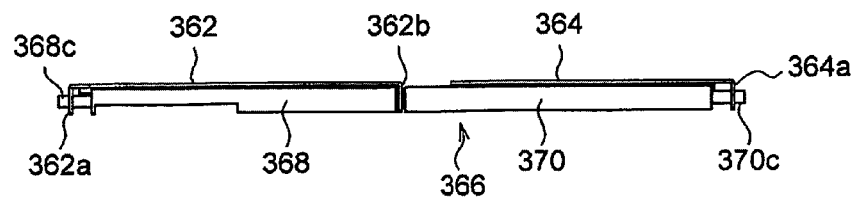
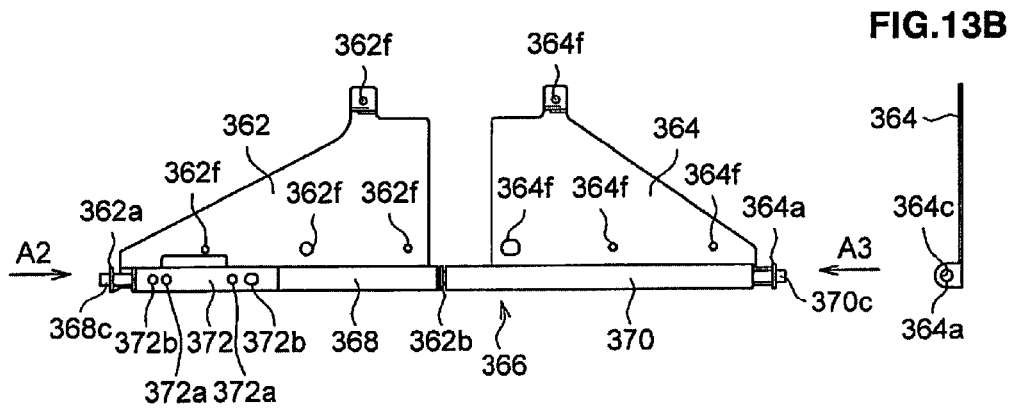
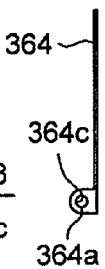
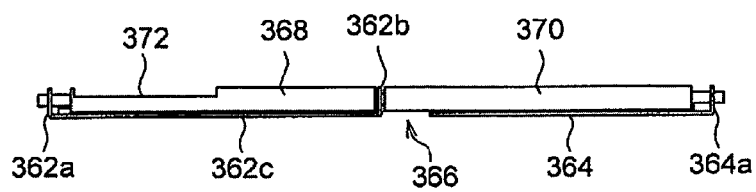
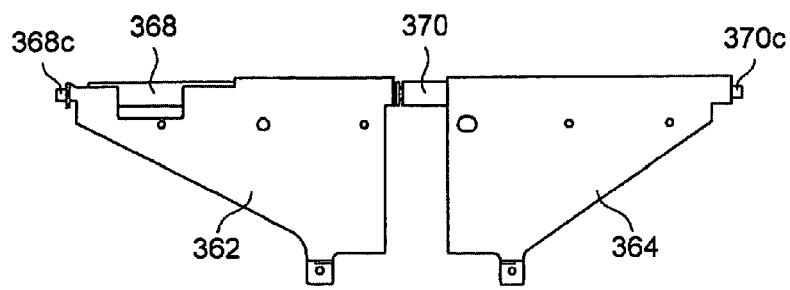

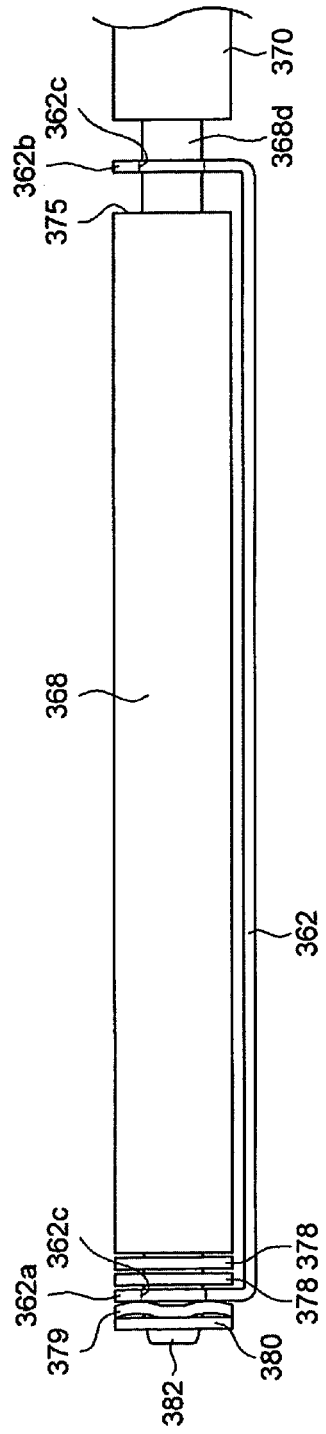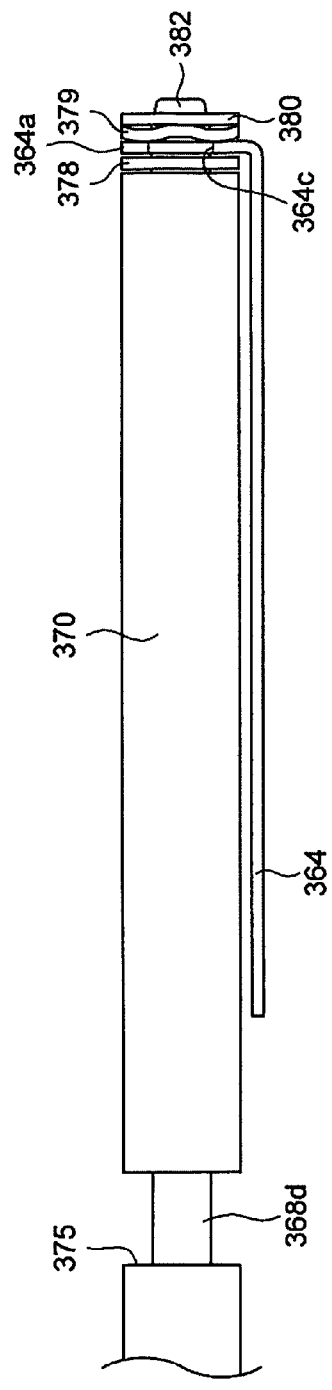

DISPLAY DEVICE

CROSS REFERENCES TO RELATED APPLICATIONS

The present invention contains subject matter related to Japanese Patent Application JP 2007-137117 filed in the Japan Patent Office on May 23, 2007, the entire contents of which being incorporated herein by reference.

BACKGROUND OF THE INVENTION

1. Field of the Invention

The present invention relates to a display device.

2. Description of the Related Art

With increase in customer preference on thinner display devices, very thin display panels are being manufactured. With thinning and miniaturization of the display displaying unit (display unit) including the display panel, there is a tendency of concentrating the components configuring the display unit, and reducing the internal space of the display unit. The heat generated from the display unit, in particular, from the substrate and the electronic components associated with the display panel thus becomes an issue.

In the past, a heat sink or an air blow fan is generally arranged in the electronic component to release heat generated from the heat generating source such as substrate and electronic component to the outside of the electronic component. Patent document 1 and Patent document 2 disclose electronic components in which a first configuring portion involving heat generating source and a second configuring portion not involving heat generating source are coupled by a hinge with enhanced heat conductivity to transmit the heat generated from the heat generating source to the second configuring portion.

[Patent document 1] Japanese Patent Application Laid-Open No. 11-101049

[Patent document 2] Japanese Patent Application Laid-Open No. 11-102235

SUMMARY OF THE INVENTION

However, in the display unit concentrated with thinning and miniaturization, a great amount of heat is released from the substrate or the electronic component serving as the heat generating source. Thus, there is an issue that sufficient heat radiating effect can hardly be obtained by simply conducting the heat generated from the display unit involving heat generating source to the configuring portion in which heat generation is relatively small other than the display unit through the hinge.

This issue is significant especially when sufficient heat conductive characteristics is not ensured due to narrowing of heat conduction path such as when the display unit and another configuring portion are coupled by way of a coupling member (connection member) having a small cross section. In this case, the heat radiating method of the related art of promoting heat radiation by conducting the heat generated from the configuring portion involving heat generating source to another configuring portion through the coupling part is not effective from the standpoint of heat radiation efficiency of the entire display device.

It is desirable to provide a display device capable of efficiently releasing heat generated at the substrate mounted with electronic components.

According to an embodiment of the present invention, there is provided a display device including a display panel; a substrate arranged at a lower part of a rear surface of the display panel, and mounted with an electronic component for functioning the display panel; hinge plates, arranged at a rear surface of the substrate so as to cover at least one part of the substrate or the electronic component, for holding the display panel and diffusing heat of the substrate or the electronic component; and a supporting shaft arranged extending at a lower part of the display panel and turnably coupled with the hinge plates with respect to a center axis.

According to such configuration, the substrate mounted with the electronic component for functioning the display panel is arranged at the lower part of the rear surface of the display panel. The hinge plates are arranged at the rear surface of the substrate so as to cover at least one part of the substrate or the electronic component, and the hinge plates hold the display panel and diffuse heat generated at the substrate. The supporting shaft is arranged extending at the lower part of the display panel and the hinge plates are turnably coupled thereto with respect to a center axis. Since the hinge plates are arranged to cover one part of the substrate or the electronic component, which is the heat generating source, heat of the substrate or the electronic component is conducted to the hinge plates, diffused at the surface of the hinge plates, and efficiently released towards the rear surface side of the display panel.

Furthermore, the substrate or the electronic component and the hinge plates may contact through a heat conductive member.

According to such configuration, the heat conduction efficiency from the substrate or the electronic component to the hinge plates enhances by the heat conduction member since the substrate or the electronic component and the hinge plates contact by way of the heat conduction member. The heat conduction member may be heat radiation sheet, graphite sheet, heat pipe, heat transfer line, or the like.

Moreover, a metal rear cover may be attached to rear surfaces of the hinge plates.

According to such configuration, the heat of the hinge plates is conducted to the rear cover, diffused at the rear cover, and efficiently released to the outside since the metal rear cover is attached to the rear surfaces of the hinge plates.

Furthermore, the hinge plates and the rear cover may contact through a heat conductive member.

According to such configuration, the heat conduction efficiency from the hinge plates to the rear cover enhances by the heat conduction member since the hinge plates and the rear cover contact by way of the heat conduction member.

Moreover, the electronic component may be a driver IC for providing a drive signal to the display panel; and the driver IC may be arranged along the supporting shaft extending at the lower part of the display panel.

According to such configuration, the driver IC is arranged along the supporting shaft extending at the lower part of the display panel. Since the hinge plates are arranged at the rear surface of the driver IC, the heat of the driver IC serving as the heat generating source Is conducted to the hinge plates, diffused at the hinge plates, and efficiently released to the outside.

According to the embodiments of the present invention described above, a display device capable of efficiently releasing heat from the substrate mounted with electronic components can be provided.

BRIEF DESCRIPTION OF THE DRAWINGS

FIGS. 5A to 5G are frame format views showing a configuration of a cover of the arm unit in detail;

FIGS. 8A and 8B are frame format views showing a configuration of a rear cover;

FIGS. 9A to 9G are frame format views showing a configuration of a T-cover;

FIGS. 13A to 13E are frame format views showing a configuration of the hinge in detail;

FIGS. 15A and 15B are frame format views showing an engagement state of a first hinge plate and a second hinge plate, and the shaft;

DETAILED DESCRIPTION OF THE PREFERRED EMBODIMENTS

Figure 1:
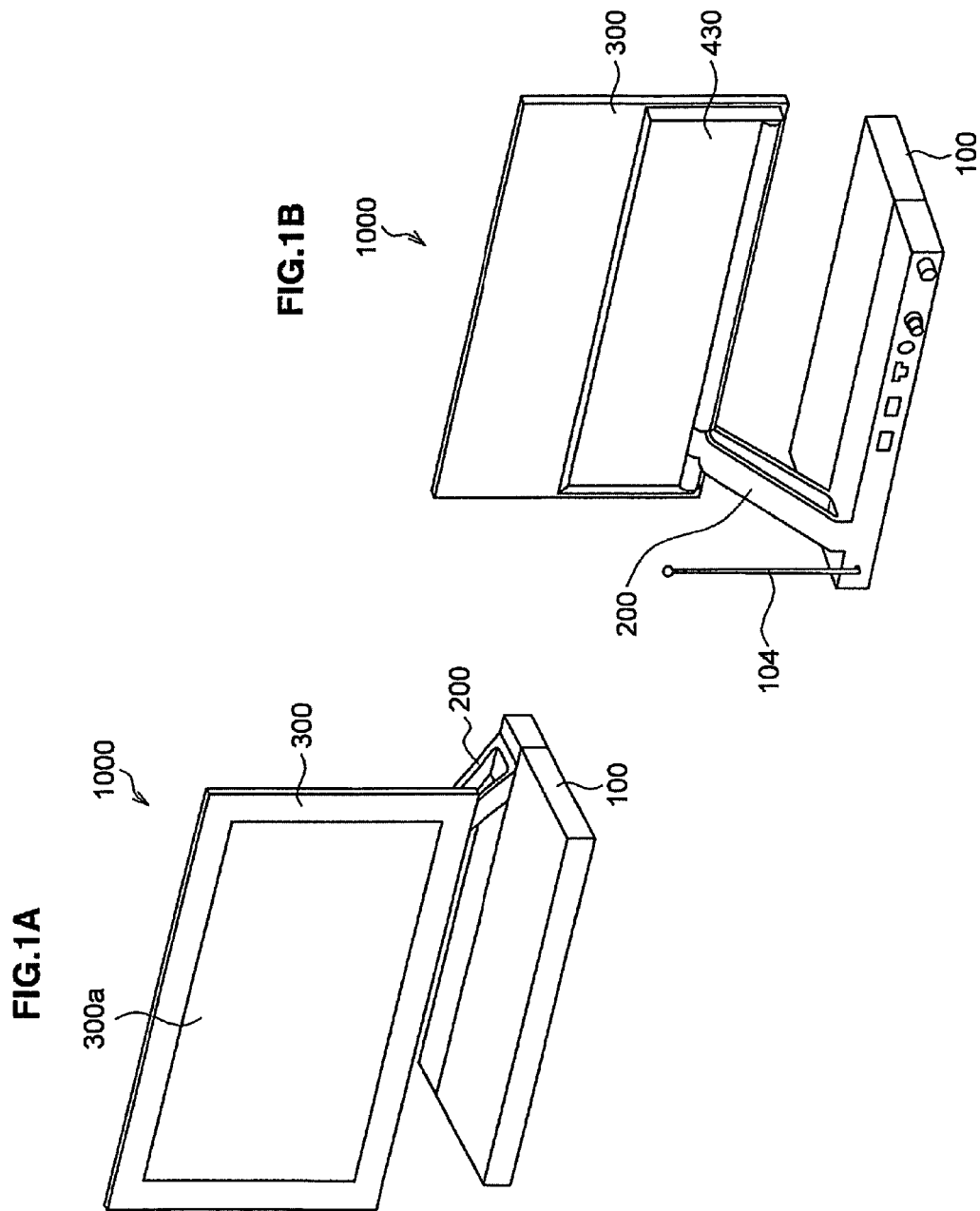
FIGS. 1A and 1B are schematic perspective views showing an outer appearance of a display device according to one embodiment of the invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

[Overall Configuration of Display Device]

Figure 2:
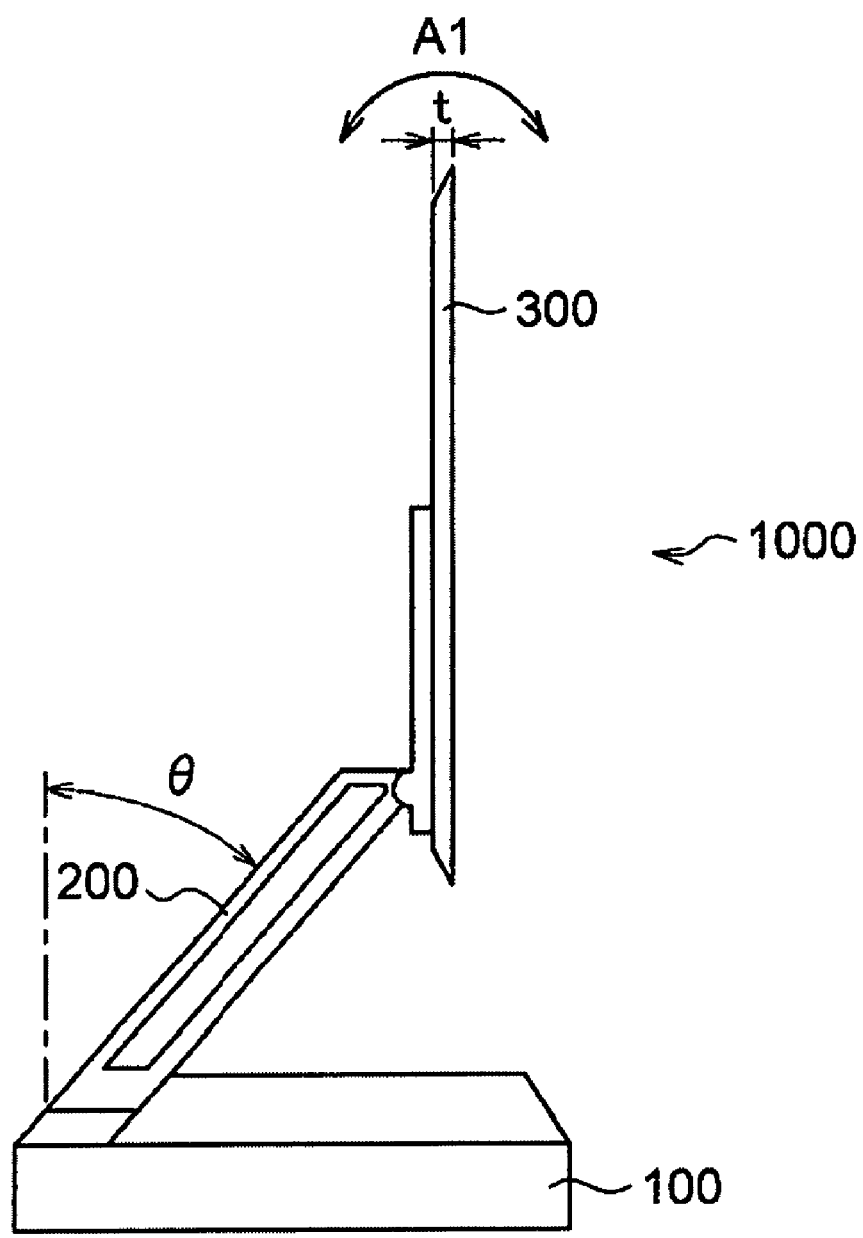
FIG. 2 is a schematic perspective view showing a state of the display device seen from the left side on the front surface side.

FIGS. 1A and 1B are schematic perspective views showing an outer appearance of a display device 1000 according to one embodiment of the present invention. FIG. 1A is a schematic perspective view showing the display device 1000 seen from the upper right on the front surface side. FIG. 1B is a perspective view showing the display device 1000 seen from the upper right on the back surface side of the display device 1000. FIG. 2 is a schematic perspective view showing the display device 1000 seen from the left on the front surface side.

As shown in FIGS. 1A, 1B, and 2, the display device 1000 of the present embodiment is configured to include a body stand unit (body unit) 100, an arm unit (supporting unit) 200, and a display displaying unit (display unit) 300. The display device 1000 receives television broadcast pictures etc., and displays the same on a display screen 300a of the display unit 300.

The display unit 300 includes a display panel (organic EL (electro luminescence) panel) 320 for displaying images using organic EL phenomenon. The organic EL panel 320 is configured to include a plurality of organic EL elements, which are self-emitting elements, and does not include configurations such as backlight, and thus the thickness thereof can be made sufficiently thin. As shown in FIG. 2, the display unit 300 of the present embodiment is a thin panel having a very thin thickness, the thickness t being suppressed to less than or equal to about a few mm (about 3 mm).

The arm unit 200 is arranged at one location on the back side of the body unit 100 and is arranged standing upward from the body unit 100. The arm unit 200 is arranged more to the right side than the center in the transverse direction (horizontal direction) of the body unit 100 when the display device 1000 is seen from the front surface side, and is connected on the right side than the center in the transverse direction of the display unit 300. Thus, in the display device 1000 of the present embodiment, the arm unit 200 is arranged on one of the left or the right side from the center in the horizontal direction of the display unit 300, and the display unit 300 is supported in a cantilever manner. The arm unit 200 may be connected at the end in the horizontal direction of the display unit 300. A cantilever structure may be obtained by connecting the upper end of the arm unit 200 near the center in the horizontal direction of the display unit 300, and connecting the lower end to the end of the body unit 100 as shown in FIGS. 1A and 1B.

A backlight is necessary in the case of a liquid crystal display, and thus the thickness of the display unit becomes thicker and the weight becomes heavier. In particular, considering usage for a display of displaying television pictures rather than for a computer display, greater number of backlights is arranged than in the computer display to ensure image quality as a television receiver. In addition to backlights, an inverter for controlling the backlight is also necessary in the liquid crystal display. Thus, in the case of the liquid crystal display, the weight is heavier and the rigidity of the displaying unit including the arm unit is greatly enhanced to support the display unit in a cantilever manner, whereby the structure becomes complicating and the weight becomes heavier. Therefore, it is not realistic to support the liquid crystal display in a cantilever manner in view of convenience of the user, manufacturing cost, and the like.

The organic EL panel is made up of organic EL elements, which are self-emitting elements, and thus does not require backlights and configuration members such as an inverter related thereto, and can be configured light only with the panel made of thin-plate glass. Therefore, according to the present embodiment, the display unit 300 itself can be configured to a very light weight, and the display unit 300 can be supported in a cantilever manner.

The display unit 300 is turnable in the direction of an arrow A1 in FIG. 2 with the coupling part with respect to the arm unit 200 as the center, and the user can set a tilt position of the display unit 300 to a desired angle.

In the display panel of the related art, the member for supporting the display panel supports the central part in the transverse direction of the display panel from the lower side in the case of one-point support. In the case of two-point support, the vicinity of both ends In the transverse direction of the display panel is supported from the lower side. In the present embodiment, the arm unit 200 is arranged shifted from the central part in the transverse direction of the display unit 300 and the display unit 300 is supported in a cantilever manner, and thus the arm unit 200 is out of the view of the user, and the user can independently recognize only the display screen 300a. The user can get an impression as if the display unit 300 is floating on the body unit 100 without the arm unit 200. The user then can independently and closely look only at the display screen 300a by supporting the display unit 300 in a cantilever manner.

The degree of freedom in installing the arm unit 200 enhances since there is no need to connect the root of the arm unit 200 to the central part of the body unit 100. Thus, the installing position of the arm unit 200 with respect to the body unit 100 can be determined In view of the arrangement etc. of the internal structure of the body unit 100 and the substrate, and the degree of freedom of design can be enhanced. The configuring members can be arranged in the most efficient manner in view of the internal structure of the body unit 100, and the size of the display device 1000 can be suppressed to a minimum. Furthermore, since the arm unit 200 is not arranged at the central part of the body unit 100, a wide effective space can be created at the upper surface of the body unit 100, and the display part, the operation button, the LED display lamp etc. can be freely arranged on the upper surface of the body unit 100.

As shown in FIGS. 1A, 1B, and 2, the arm unit 200 is arranged inclined towards the back surface of the display unit 300 from the rear side of the body unit 100. In FIG. 2, an inclination angle θ of the arm unit 200 with respect to a perpendicular direction is about 45 to 60°. When the display unit 300 is viewed from the front surface, the arm unit 200 will be hidden behind the display unit 300, thereby suppressing the arm unit 200 from being recognized in the view of the user. Therefore, the arm unit 200 can be reliably suppressed from being recognized in the view of the user according to the synergetic effect of arranging the arm unit 200 in a shifted manner from the central part of the display unit 300.

The connection state of the display unit 300 and the body unit 100 is suppressed from being directly recognized by the user since only the display unit 300 and the body unit 100 appear in the view of the user and the arm unit 200 barely comes into view. The user thus feel as if the display unit 300 is floating in space.

In the configuration of the present embodiment, the lightness of the display unit 300 is emphasized and recognized by the user since the thickness of the display unit 300 is very thin or about a few mm. Therefore, for the user, the display unit 300 excelling in floating feeling and lightness is provided by the synergetic effect with the feeling as if the display unit 300 is floating in space.

The user then can closely look at only the display content of the display unit 300, which is recognized as if floating in space, and can concentrate on the display content without being distracted by other structures. A display device 1000 in which a satisfactory designability can be maintained while creating a feeling the display screen 300a is floating to the user, and in which the visibility of the display screen 300a is greatly enhanced can be provided.

[Configuration of Arm Unit]

Figure 3:
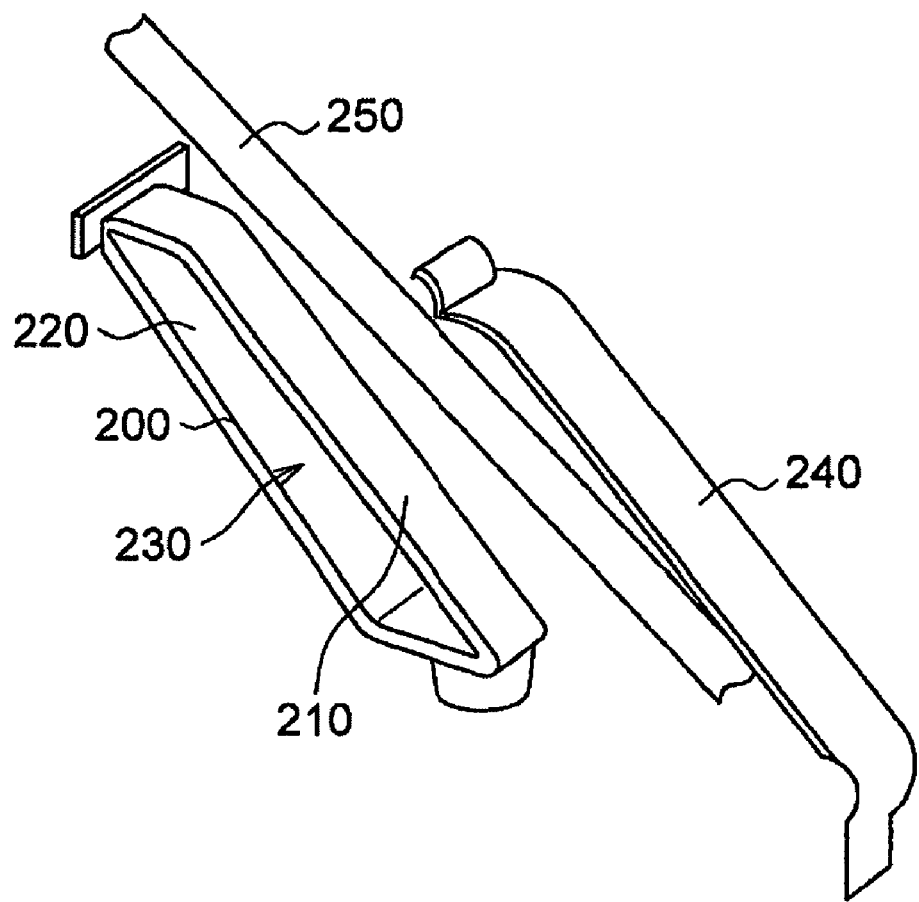
FIG. 3 is a frame format view showing a configuration of an arm unit.

FIG. 3 is a frame format view showing a configuration of the arm unit 200. As shown in FIG. 3, an opening 230 passing through the side face is formed in the arm unit 200 along the longitudinal direction thereof to have a hollow structure. According to such hollow structure, the arm unit 200 is configured by a first arm unit 210 positioned on the upper part, and a second arm unit 220 positioned on the lower part. The first arm unit 210 and the second arm unit 220 are configured to a thin flat plate shape and are arranged facing each other with the opening 230 interposed in between, and the thickness of the first arm unit 210 and the second arm unit 220 are suppressed to a minimum.

As described above, the display unit 300 is very thin and is configured to excel in lightness and floating feeling. Therefore, with respect to the arm unit 200 for supporting the display unit 300, a configuration excelling in lightness and floating feeling is obtained similar to the display unit 300 by suppressing the thickness to a minimum with the hollow structure, and lightness and floating feeling can be emphasized for the display device 1000 as a whole.

Since the weight of the liquid crystal display is heavy, it is difficult to have the arm unit as a hollow structure to obtain lightness and airiness in order to ensure strength. In the present embodiment, the necessary strength can be ensured even if the arm unit 200 has a hollow structure since the display unit 300 is configured by the organic EL panel 320. Therefore, the display unit 300 can be reliably supported, and a satisfactory designability excelling in lightness and airiness can be ensured.

A cover 240 is placed over the upper surface of the first arm unit 210. A flexible print substrate 250 for electrically connecting the body unit 100 and the display unit 300 is incorporated between the upper surface of the first arm unit 210 and the cover 240.

Figure 4A:
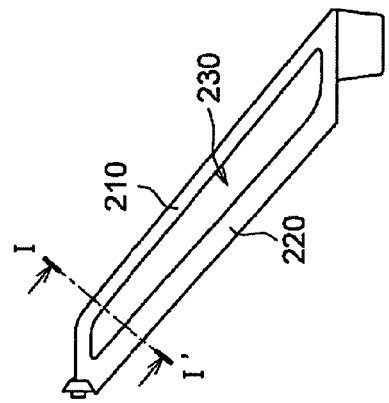
FIGS. 4A to 4G are frame format views showing a configuration of the arm unit in detail.
Figure 4B:
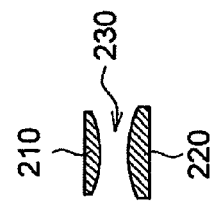
Figure 4C:
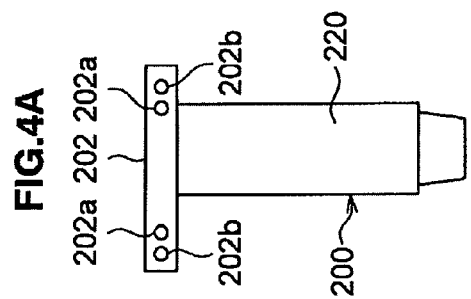
Figure 4D:
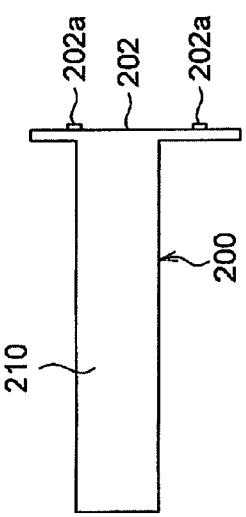
Figure 4E:
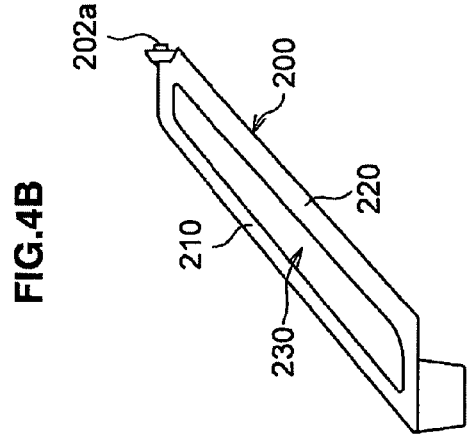
Figure 4F:
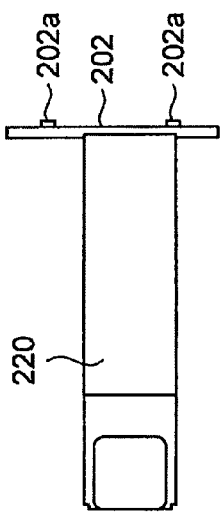
Figure 4G:
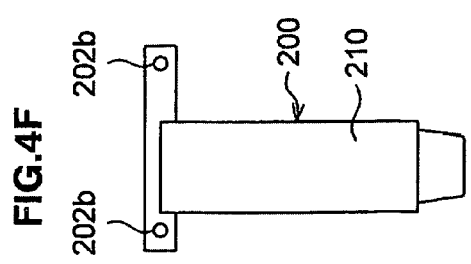

FIGS. 4A to 4G are frame format views showing the configuration of the arm unit 200 in detail. FIG. 4A is a front view of the arm unit 200 seen from the front surface side of the display unit 300, FIG. 4B is a left side view, FIG. 4C is a right side view, FIG. 4D is a top view, FIG. 4E is a bottom view, FIG. 4F is a rear view, and FIG. 4G is a cross sectional view taken along a chain dashed line I-I' in FIG. 4C. The body of the arm unit 200 with the cover 240 detached can be configured as an integrated block through casting or machining with metal such as aluminum as the raw material.

FIGS. 5A to 5G are frame format views showing a configuration of the cover 240 in detail. FIG. 5A is a front view of the cover 240 seen from the front surface side of the display unit 300, FIG. 5B is a left side view, FIG. 5C is a right side view, FIG. 5D is a top view, FIG. 5E is a bottom view, FIG. 5F is a rear view, and FIG. 5G is a cross sectional view taken along a chain dashed line II-II' in FIG. 5C. As shown in FIGS. 5A to 5G, the cover includes a concave part 242, and sides walls 242a on both sides of the concave part 242 fit into the side faces in the width direction of the first arm unit 210. The flexible print substrate 250 is arranged between the first arm unit 210 and the cover 240 while being accommodated at the bottom of the concave part 242. The flexible print substrate 250 thus is not exposed to the outside.

The weight of the display unit 300 can be suppressed to a minimum, and the necessary strength can be ensured even if the arm unit 200 has a hollow structure by configuring the display unit 300 with the organic EL panel 320. The display unit 300 configured to be light and thin is obtained, and floating feeling and airiness can be evoked on the user by having the arm unit 200 as a hollow structure and suppressing the volume of the arm unit 200 to a minimum. A structure that prevents the user from being aware of the existence of the wiring is obtained by incorporating the flexible print substrate 250 in the first arm unit 210.

[Configuration of Display Unit]

Figure 6:
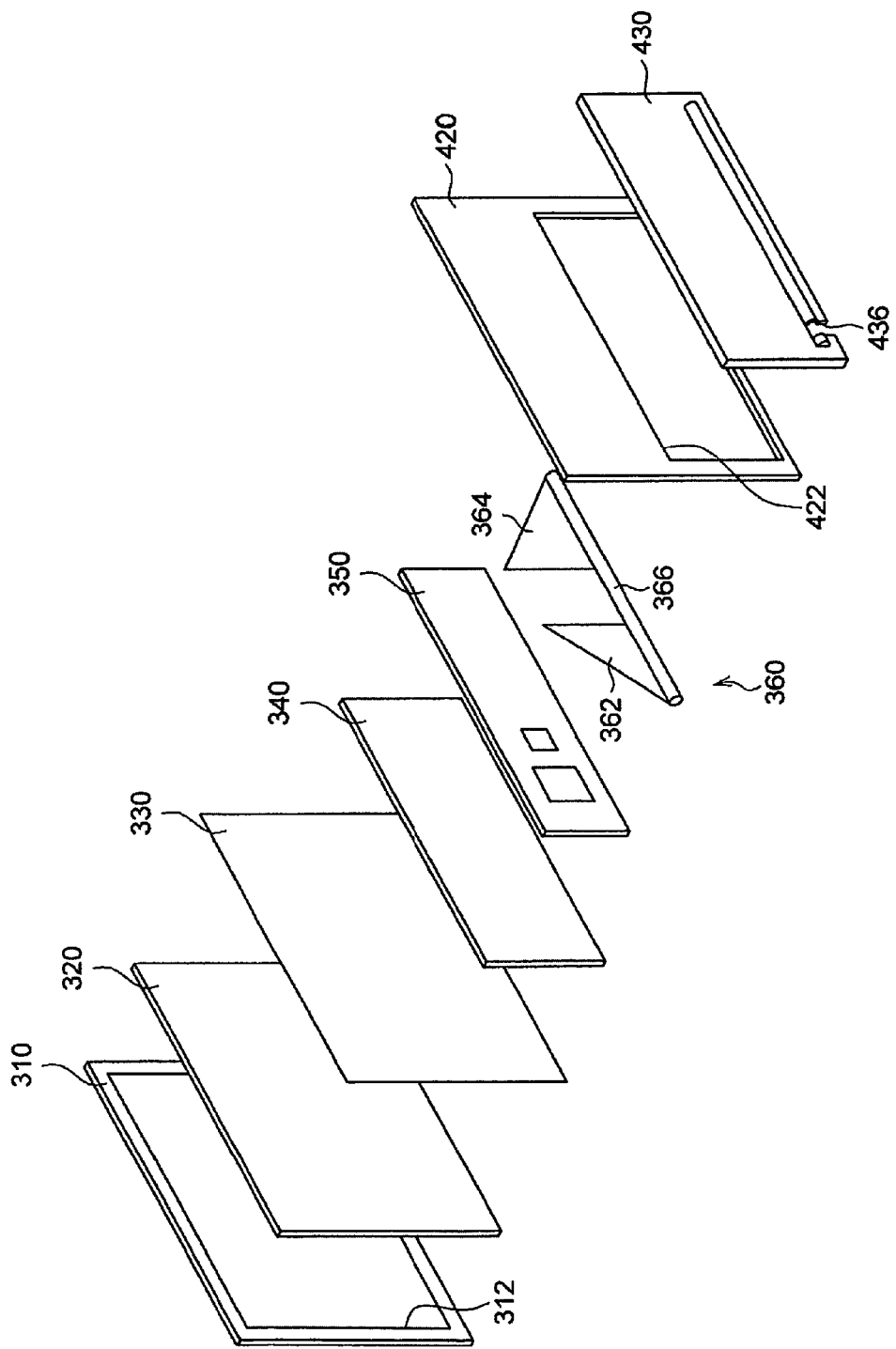
FIG. 6 is an exploded perspective view showing a configuration of a display unit.

FIG. 6 is a frame format view showing a configuration of the display unit 300, and shows an exploded perspective view of the display unit 300. As shown in FIG. 6, the display unit 300 is configured to include a bezel 310, the organic EL panel 320, a graphite sheet 330, a base plate 340, a T-substrate 350, a hinge 360, a rear cover 420, and a T-cover 430.

The base plate 340 is a member that constitutes the main frame of the display unit 300, where the arm unit 200 is coupled to the base plate 340 by way of the hinge 360. The main configuring members such as the organic EL panel 320, the T-substrate 350, and the hinge 360 are fixed with respect to the base plate 340. The main members configuring the display unit 300 such as the organic EL panel 320, the T-substrate 350, the hinge 360, the rear cover 420, and the T-cover 430 are all attached with the base plate 340 as a reference.

The graphite sheet 330 is attached to the back surface of the organic EL panel 320. The organic EL panel 320 is fixed to the base plate 340 through adhesive tape with the surface attached with the graphite sheet 330 facing the base plate 340.

The T-substrate 350 is made of hard substrate, and is connected with the power supply line and the signal line connecting with the organic EL panel 320. The size of the T-substrate 350 corresponds to the size of the base plate 340, and the T-substrate 350 is fixed on the side opposite to the surface fixed with the organic EL panel 320 with respect to the base plate 340.

The hinge 360 is a configuring member for coupling the arm unit 200 and the base plate 340. The hinge 360 is configured to include configuring members such as a first hinge plate 362 and a second hinge plate 364 made of metal and having a triangular plan shape, a shaft 366 made of metal, and the like. The shaft 366 is arranged horizontally along the lower end of the display unit 300. The first hinge plate 362 and the second hinge plate 364 are fixed with respect to the base plate 340, and are turnably attached with respect to the shaft 366. The shaft 366 is fixed with respect to the arm unit 200. Therefore, the base plate 340 can turn with respect to the shaft 366 fixed to the arm unit 200, in which case the center axis of rotation becomes the center axis of the shaft 366. Thus, the display unit 300 can be turned in the direction of the arrow A1 in FIG. 2, and the tilt angle of the display unit 300 can be varied.

The bezel 310 is a member that is attached at the edge of the organic EL panel 320, and that constitutes the outer appearance of the edge of the display unit 300. The rear cover 420 and the T-cover 430 are metal covers that cover the back surface of the display unit 300. The rear cover 420 has an opening 422 formed at a portion corresponding to the position of the T-substrate 350 and the hinge 360, and mainly covers the upper part of the back surface of the display unit 300. The T-cover 430 is configured to be attached in correspondence to the position of the opening 422 so as to cover the T-substrate 350 and the hinge 360.

The base plate 340, the T-substrate 350, and the hinge 360 are all arranged only at the region of less than half of the lower side of the display unit 300, and the area occupied by the base plate 340, the T-substrate 350, and the hinge 360 with respect to the area of the entire display unit 300 is suppressed to a minimum. Other than the region arranged with the base plate 340, the T-substrate 350, and the hinge 360, only three members of mainly the organic EL panel 320, the graphite sheet 330, and the rear cover 420 define the thickness of the display unit 300. Therefore, in the region including the upper half of the display unit 300, in particular, the thickness of the display unit 300 can be very thin, and the thickness can be suppressed to about 3 mm, as described above.

Since the display device 1000 is normally placed on the table etc., the user rarely sees the display unit 300 from the lower side, and the thickness of the display unit 300 is recognized from the upper side. Therefore, the thinness of the display unit 300 can be emphasized to the user by arranging the members such as the base plate 340, the T-substrate 350, and the hinge 360 on the lower side of the display unit 300, and suppressing the thickness on the upper side of the display unit 300 to a minimum. Therefore, a satisfactory designability can be maintained while creating a floating feeling and airiness as described above.

Figure 7A:
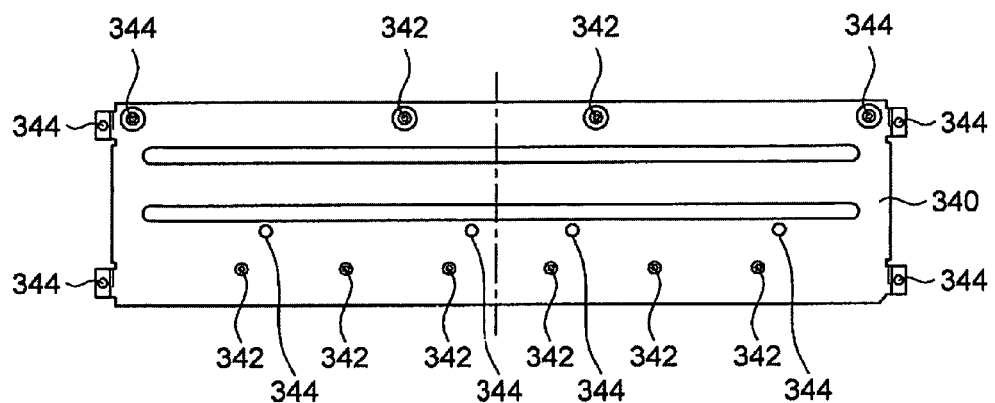
FIGS. 7A to 7C are plan views showing a configuration of a base plate.
Figure 7B:
Figure 7C:
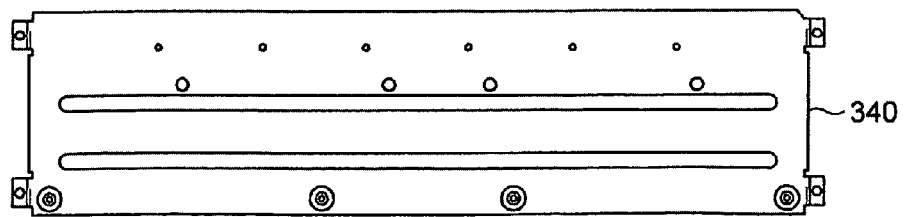

FIGS. 7A to 7C are plan views showing a configuration of the base plate 340. FIG. 7A is a front view of the base plate 340 seen from the rear surface side of the display unit 300, FIG. 7B is a bottom view of FIG. 7A, and FIG. 7C is rear view of FIG. 7A. The base plate 340 is configured from a press molded metal plate. As shown in FIGS. 7A to 7C, a plurality of screw holes 342, 344 is formed in the base plate 340. The screw hole 342 is used to fix the first hinge plate 362 and the second hinge plate 364. The other screw hole 344 is used to fixe components of the display unit 300 such as the T-substrate 350 and the T-cover 430.

The bezel 310 is fixed to the periphery of the organic EL panel 320 through adhesion. As shown in FIG. 6, an opening 312 for exposing the display screen 300a of the organic EL panel 320 is formed in the bezel 310.

FIGS. 8A and 8B are frame format views showing a configuration of the rear cover 420. FIG. 8A is a front view of the rear cover 420 seen from the front surface side of the display unit 300, and FIG. 8B is a rear view of the rear cover 420 seen from the rear surface side of the display unit 300.

FIGS. 9A to 9G are frame format views showing a configuration of the T-cover 430. FIG. 9A is a front view of the T-cover 430 seen from the front surface side of the display unit 300, FIG. 9B is a left side view, FIG. 9C is a right side view, FIG. 9D is a top view, FIG. 9B is a bottom view, FIG. 9F is a rear view, and FIG. 9G is a cross sectional view taken along a chain dashed line III-III' in FIG. 9A.

As shown in FIGS. 8A and 8B, an opening 422 is formed in the rear cover 420 in correspondence to the position of the base plate 340, the T-substrate 350, and the hinge 360. A pass-through hole 424 for inserting the screw to fix the rear cover 420 is formed in the rear cover 420. The rear cover 420 is fixed with respect to the bezel 310, as described later, to cover the upper part of the rear surface side of the organic EL panel 320.

Figure 10:
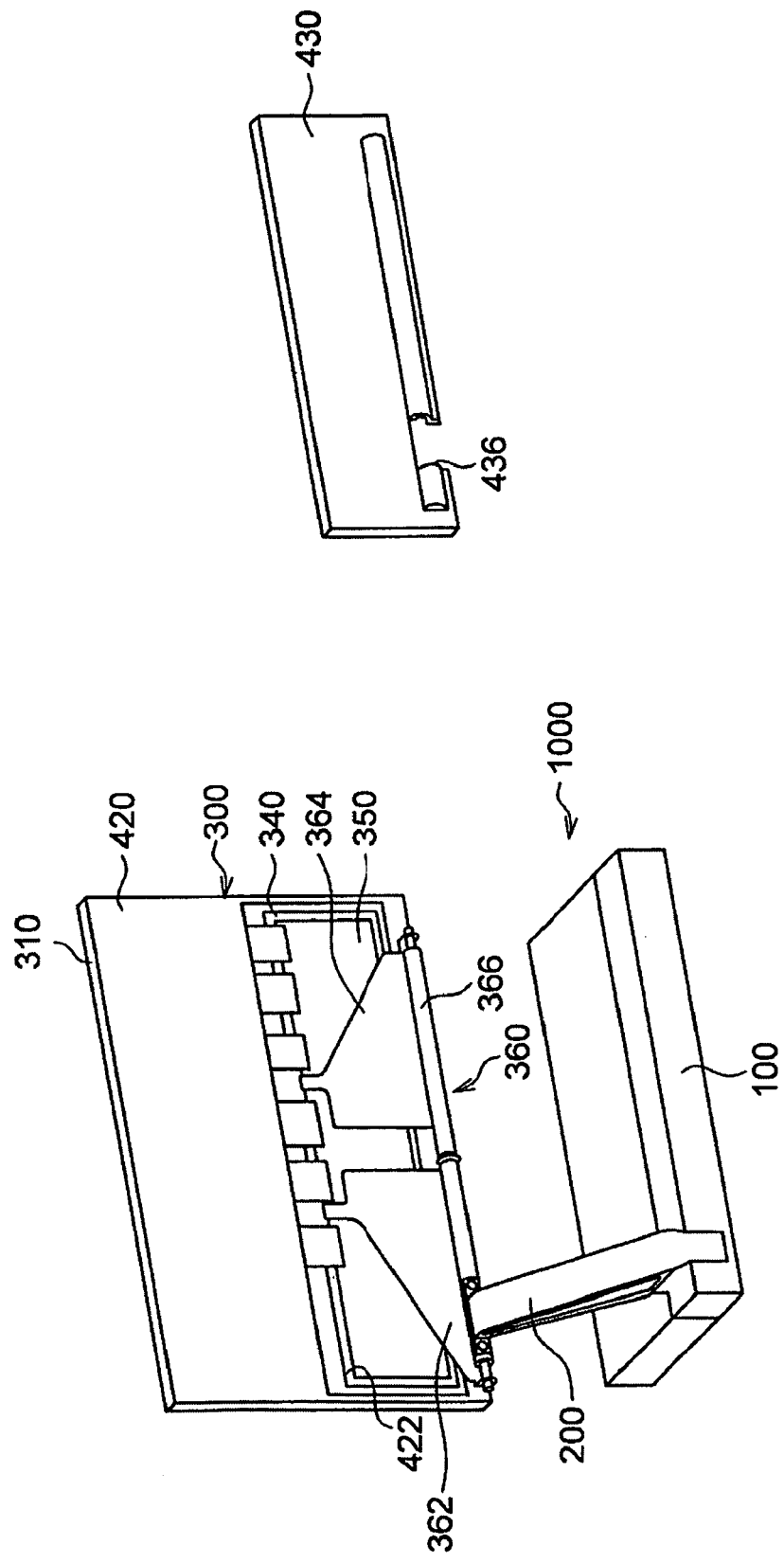
FIG. 10 is a frame format view showing a state of the display device seen from the rear surface side with the T-cover detached.

FIG. 10 shows a state of the display device 1000 seen from the rear surface side with the T-cover 430 detached. The base plate 340, the T-substrate 350, and the hinge 360 are arranged in the region on the lower side of the display unit 300, where the T-substrate 350 and the hinge 360 are exposed to the outside from the opening 422 of the rear cover 420 with the T-cover 430 detached.

As shown in FIGS. 9A to 9G, the T-cover 430 includes a concave part 432 corresponding to the shaft 366 of the hinge 360, and a concave part 434 corresponding to a region arranged with the base plate 340, the T-substrate 350, the first hinge plate 362, and the second hinge plate 364. A cutout 436 is formed in the T-cover 430 at a position corresponding to the arm unit 200.

When the T-cover 430 is placed over the rear cover 420, the shaft 366 is accommodated in the concave part 432, and the T-substrate 350, the first hinge plate 362, and the second hinge plate 364 are accommodated in the concave part 434. Thus, the configuring members such as the T-substrate 350 and the hinge 360 are covered with the T-cover 430, as shown in FIG. 1B. The arm unit 200 Is projected towards the back side from the cutout 436 of the T-cover 430.

Therefore, only the rear cover 420, the T-cover 430, and the arm unit 200 are exposed to the outside at the rear surface side of the display unit 300, and a very simple and sophisticated outer appearance can be obtained. In particular, the display unit 300 that is very thin and that has a floating feeling and lightness can be configured since the configuring members related to thickness at the upper side of the display unit 300 are mainly three members of the organic EL panel 320, the graphic sheet 330, and the rear cover 420. The display unit 300 having sufficient strength while being very thin can be configured since the base plate 340 is a rigid member of the display unit 300 and the main components of the display unit 300 are fixed with respect to the base plate 340.

[Configuration of Hinge]

Figure 11:
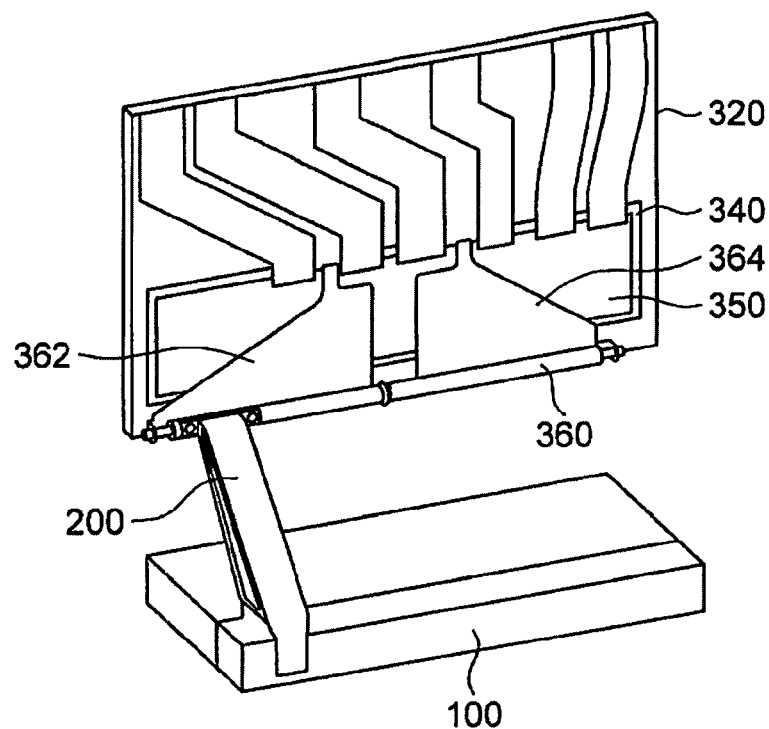
FIG. 11 is a frame format view showing a state in which members such as rear cover and bezel are detached from the state of FIG. 10.
Figure 12:
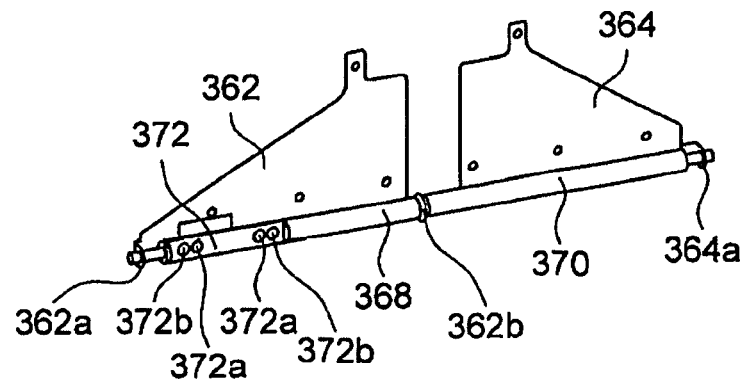
FIG. 12 is a perspective view showing a configuration of a hinge.

FIG. 11 is a view showing a state of the display device 1000 seen from the rear surface side, showing a state in which the members such as the rear cover 420 and the bezel 310 are detached from the state of FIG. 10. FIG. 12 is a perspective view showing a configuration of the hinge 360.

FIGS. 13A to 13E are frame format views showing a configuration of the hinge 360 in detail. FIG. 13A is a front view of the hinge 360 seen from the rear surface side of the display unit 300, FIG. 13B is a right side view, FIG. 13C is a top view, FIG. 13D is a bottom view, and FIG. 13E is a rear view.

The shaft 366 of the hinge 360 is fixed with respect to the arm unit 200. As shown in FIGS. 4A to 4G, a receiving surface 202 to be attached with the shaft 366 is arranged at the distal end of the tipper part of the arm unit 200. A boss 202a and a hole 202b are formed in the receiving surface 202.

As shown in FIG. 12, a flat surface 372 is formed at one part of the outer peripheral surface of the shaft 366. The flat surface 372 is formed with a hole 372a to be Inserted with the boss 202a of the receiving surface 202 of the arm unit 200. The flat surface 372 is formed with a screw hole 372b at a position corresponding to the hole 202b.

The flat surface 372 contacts the receiving surface 202 of the arm unit 200, and the boss 202a is inserted to the hole 372a. In this state, the screw is inserted to the hole 202b from the back side of the arm unit 200 and screwed into the screw hole 372b so that the shaft 366 is fixed to the arm unit 200. As shown in FIG. 11, the shaft 366 of the hinge 360 and the arm unit 200 are integrated. The integrated shaft 366 and the arm unit 200 become a rigid member that supports the display unit 300.

The shaft 366 is arranged horizontally along the lower side of the display unit 300. The first hinge plate 362 and the second hinge plate 364 are turnably engaged to the shaft 366 with the shaft 366 as the center axis of rotation.

As shown in FIG. 13A, a plurality of holes 362*f* is formed in the first hinge plate 362. A plurality of holes 364*f* is formed in the second hinge plate 364. The holes 362*f*, 364*f* correspond to the position of the screw hole 342 of the base plate 340, and the first hinge plate 362 and the second hinge plate 364 are fixed with respect to the base plate 340 with the T-substrate 350 interposed in between the base plate 340 by screwing in the screw inserted to the holes 362*f*, 364*f* to the screw hole 342 of the base plate 340. The first hinge plate 362 and the second hinge plate 364 thereby become strength members for ensuring the rigidity of the display unit 300 with the base plate 340.

Figure 14A:
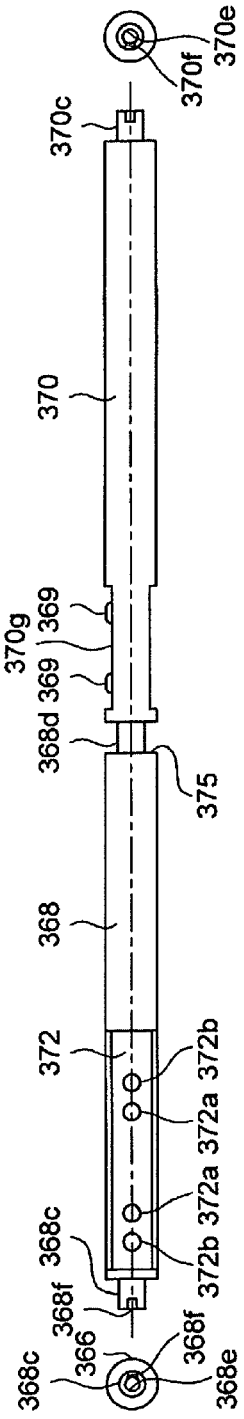
FIGS. 14A to 14C are frame format views showing a configuration of a shaft in detail.
Figure 14B:
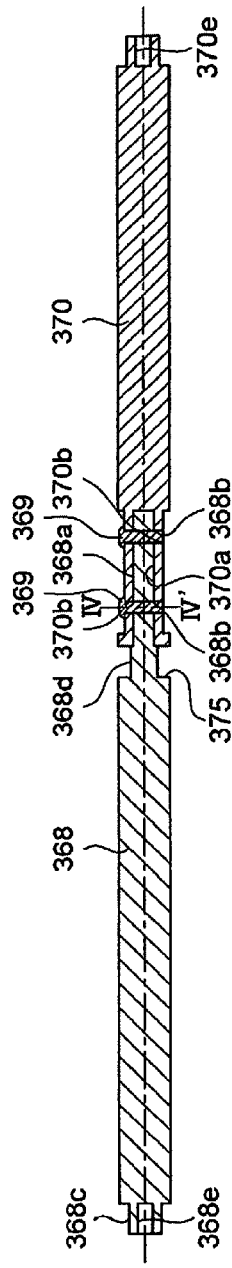
Figure 14C:
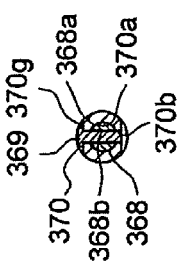

FIGS. 14A to 14C are frame format views showing a configuration of the shaft 366 in detail. FIG. 14A is a front view showing the shaft 366 from the rear surface side of the display unit 300, the right side view, and the left side view. FIG. 14B is a cross section taken along the center axis of the shaft 366. FIG. 14C is a cross section taken along a chain dashed line IV-IV' in FIG. 14A.

As shown in FIGS. 14A to 14C, the shaft 366 is divided at the middle to include two shafts 368 and 370. The above-described flat surface 372 is arranged on the shaft 368.

As shown in FIGS. 14A and 14B, a groove 375 is formed at a portion where the shaft 368 and the shaft 370 are coupled. An engagement shaft 368a to be inserted to an engagement hole 370a of the shaft 370 is arranged at the end of the shaft 368. The flat surface 370g is formed at the end of the shaft 370.

As shown in FIG. 14B, two holes 368b to be inserted with a pin 369 are formed at the engagement shaft 368a of the shaft 368. Two holes 370b to be inserted with the pin 369 are formed at the portion where the flat surface 370g of the shaft 370 is formed.

The shaft 368 and the shaft 370 are fixed by inserting and caulking the pin 369 to the hole 368b and the 370b with the engagement shaft 368a inserted to the engagement hole 370a. In this case, the outer diameter of the pin 369 and the inner diameter of the hole 368b and the hole 370b are fitted and fixed by caulking.

As shown in FIG. 14A, an engagement shaft 368c is arranged at the end of the shaft 368 on the side opposite to the engagement shaft 368a. The engagement shaft 368d is arranged at the position of the groove 357. A hole 368e of a predetermined depth is formed along the center axis in the engagement shaft 368c. An engagement groove 368f of a predetermined depth is formed at one part of the end face of the engagement shaft 368c.

Similarly, an engagement shaft 370c is arranged at the end of the shaft 370. A hole 370e of a predetermined depth is formed along the center axis in the engagement shaft 370c. An engagement groove 370f of a predetermined depth is formed at one part of the end face of the engagement shaft 370c.

As shown in FIGS. 12, and 13A to 13E, two engagement parts 362a, 362b that engage with the engagement shafts 368c, 368d at both ends of the shaft 368 are formed at both ends of the first hinge part 362 through bend processing. A pass-through hole 362c (not shown in FIGS. 12, and 13A to 13E) is formed in the engagement parts 362a, 362b.

One engagement part 364a that engages the engagement shaft 370c arranged at one end of the shaft 370 is formed at one end of the second hinge plate 364 through bend processing. As shown in FIG. 13B, a pass-through hole 364c is formed in the engagement part 364a.

FIGS. 15A and 15B are frame format views showing an engagement state of the first hinge plate 362 and the second hinge plate 364, and the shaft 366, showing the shaft 366 from the lower side of the display unit 300. FIG. 15A shows a state in which the first hinge plate 362 is turnably attached to the shaft 366. FIG. 15B shows a state in which the second hinge plate 364 is turnably attached to the shaft 366.

As shown in FIG. 15A, the pass-through hole 362c of the engagement part 362a of the first hinge part 362 is inserted to the engagement shaft 368c of the shaft 368 with a washer 378 inserted to the engagement shaft 368c. The pass-through hole 362c of the engagement part 362b is inserted to the engagement shaft 368d. A lock position regulating plate 380 is attached to the distal end of the engagement shaft 368c with a spring washer 379 inserted to the engagement shaft 368e, and a caulking pin 382 is pushed into the hole 368e thereby fixing the caulking pin 382 to the hole 368e. The lock position regulating plate 380 is fixed at the distal end face of the engagement shaft 368c, and the first hinge plate 362 is turnably attached to the shaft 368.

As shown in FIG. 15B, the pass-through hole 364c of the engagement part 364a of the second hinge plate 364 is inserted to the engagement shaft 370c with a washer 378 inserted to the engagement shaft 370c, and a spring washer 379 is inserted to the engagement shaft 370c. The lock position regulating plate 380 is attached to the distal end of the engagement shaft 370c, and the caulking pin 382 is pushed into the hole 370e thereby fixing the caulking pin 382 to the hole 370e. The lock position regulating plate 380 is fixed at the distal end face of the engagement shaft 370c, and the second hinge plate 364 is turnably attached to the shaft 370.

When assembling the hinge 360, the pass-through hole 362c of the engagement part 362b of the first, hinge plate 362 is first inserted to the engagement shaft 368d of the shaft 368 with the shaft 366 separated into the shaft 368 and the shaft 370. The washer 378 is inserted to the engagement shaft 368c, and the pass-through hole 362c of the engagement part 362a is inserted to the engagement shaft 368c.

The engagement shaft 368a of the shaft 368 is inserted to the engagement hole 370a of the shaft 370, the pin 369 is inserted and caulked to the hole 368b and the hole 370b to fix and integrate the shaft 368 and the shaft 370. A groove 375 is formed between the shaft 368 and the shaft 370, and the engagement part 362b is engaged with the engagement shaft 368d in the groove 375.

The washer 378 is then inserted to the engagement shaft 370c of the shaft 370, and the pass-through hole 364c of the engagement part 364a of the second hinge part 364 is inserted to the engagement shaft 370c, The spring washer 379 is inserted to the engagement shaft 368c and the engagement shaft 370c at both ends of the shaft 366, the lock position regulating plate 380 is attached to the distal end face of the engagement shaft 368c and the engagement shaft 370c, and the caulking pin 382 is inserted and caulked to the hole 368e and the hole 370e.

The first hinge plate 362 is turnably supported with respect to the shaft 366 since the pass-through hole 362c of the engagement parts 362a, 362b arranged at two locations are turnably engaged with respect to the engagement shafts 368c, 368d at both ends of the shaft 368. The second hinge plate 364 is turnably supported with respect to the shaft 366 since the pass-through hole 364c of the engagement part 364a arranged at one location is turnably engaged with respect to the engagement shaft 370c at one end of the shaft 370. Therefore, both the first hinge plate 362 and the second hinge plate 364 are turnably attached with respect to the shaft 366.

Therefore, the display unit 300 can be turnably supported with the shaft 366 which is the rigid member as a center axis of rotation by attaching the first hinge plate 362 and the second hinge plate 364 to the base plate 340.

In the present embodiment, the first hinge plate 362 and the second hinge plate 364 are turnably supported with respect to the shaft 366, but one hinge plate may be turnably supported. However, if the shaft 366 is long, the hinge plate might deform in a direction away from the shaft at the middle portion in the longitudinal direction of the shaft 366 if the hinge plate is turnably supported at the engagement part arranged at both ends of one hinge plate. The hinge plate might twist in the rotating direction and a difference in rotation angle position might be created between both ends of the hinge plate, whereby the hinge plate is unable to rotate smoothly. If the hinge plate is divided into the first hinge plate 362 and the second hinge plate 364 and two engagement parts 362a, 362b are arranged at both ends of the first hinge plate 362 as in the present embodiment, the engaging location with the shaft 366 can be increased to three locations in the hinge plate as a whole, thereby suppressing the hinge plate from deforming in the direction away from the shaft near the middle portion of the shaft 366. The rigidity of each hinge plate is increased and the twist of the hinge plate can be suppressed by dividing the hinge plate, whereby the rotation angle positions of the first hinge plate 362 and the second hinge plate 368 at both ends of the shaft 366 become the same. Therefore, the first hinge plate 362 and the second hinge plate 368 smoothly turn with respect to the shaft 366, and the tilt operation of the display unit 300 can be smoothly carried out.

[Turning Lock Mechanism of Hinge Plate]

Figure 16:
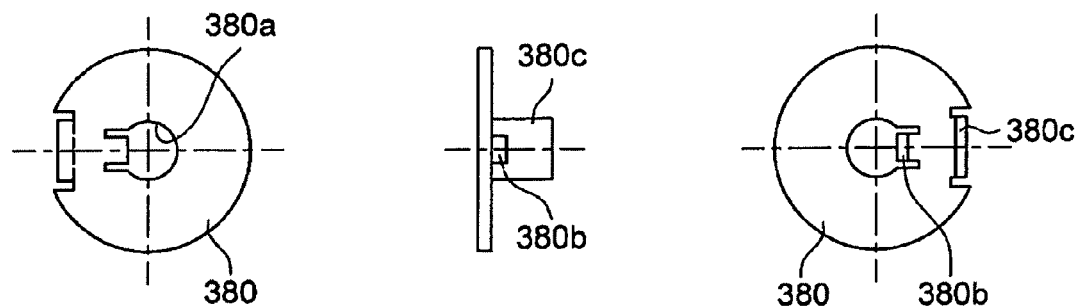
FIG. 16 is a frame format view showing a configuration of a lock position regulating plate.

FIG. 16 is a frame format view showing the lock position regulating plate 380. The lock position regulating plate 380 is formed by press working a plate material. As shown in FIG. 16, the lock position regulating plate 380 is formed with a hole 380a to be inserted with the caulking pin 382, a projection 380b engaging the engagement grooves 368f, 370f at the distal end of the engagement shafts 368c, 370c, and a projection 380c for regulating the turning lock position of the first hinge plate 362 and the second hinge plate 364.

Figure 17A:
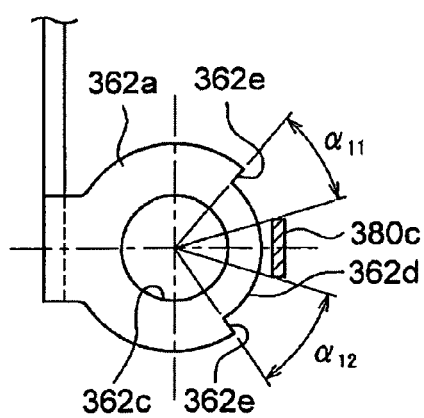
FIGS. 17A and 17B are frame format views showing a state in which the rotation angles of the first hinge plate and the second hinge plate are regulated by the lock position regulating plate.
Figure 17B:
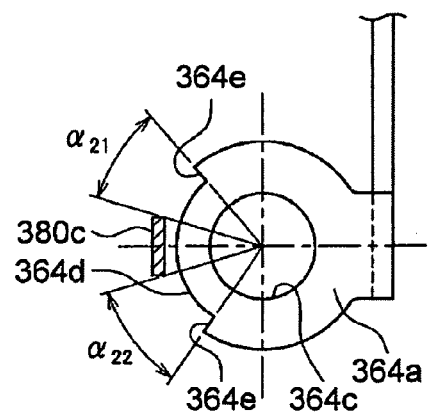

FIGS. 17A and 17B are frame format views showing a state in which the rotation position of the first hinge plate 362 and the second hinge plate 364 are regulated by the projection 380c of the lock position regulating plate 380. FIG. 17A shows a state of the engagement part 362a of the first hinge plate 362 seen from the direction of an arrow A2 in FIG. 13A. FIG. 17B shows a state of the engagement part 364a of the second hinge plate 364 seen from the direction of an arrow A3 in FIG. 13A.

As shown in FIG. 17A, the engagement part 362a of the first hinge plate 362 is formed with a concave part 362d at the contour thereof. When the projection 380b is inserted to the engagement groove 368f to attach the lock position regulating plate 380 to the distal end of the engagement shaft 368c, the projection 380c of the lock position regulating plate 380 comes to the position of the concave part 362d. When the first hinge plate 362 turns with the center axis of the shaft 366 as the center of rotation, the end face 362e on both sides of the concave part 362d contacts the projection 380c thereby regulating the turnable range of the first hinge plate 362.

Similarly, as shown in FIG. 17B, the engagement part 364a of the second hinge plate 364 is formed with a concave part 364d at the contour thereof. When the projection 380b is inserted to the engagement groove 370f to attach the lock position regulating plate 380 to the distal end of the engagement shaft 370c, the projection 380c of the lock position regulating plate 380 comes to the position of the concave part 364d. When the second hinge plate 362 turns with the center axis of the shaft 366 as the center of rotation, the end face 364e on both sides of the concave part 364d contacts the projection 380c thereby regulating the tumble range of the second hinge plate 364.

The angular range of the two end faces 362e of the concave part 362d of the first hinge plate 362 and the angular range of the two end faces 364e of the concave part 364d of the second hinge plate 364 are the same. As shown in FIG. 14A, the engagement grooves 368f and 370f for regulating the angular position of the lock position regulating plate 380 are positioned on the same angular position with respect to the center axis of the shaft 366 by defining the relative angular position of the shaft 368 and the shaft 370 with the pin 369. Thus, the angular position of the projection 380c with respect to the two end faces 362e of the concave part 362d is the same as the angular position of the projection 380c with respect to the two end faces 364e of the concave part 364d. Therefore, as shown in FIGS. 17A and 17B, the relationship α11=α21 is met when moving the tilt of the display unit 300 upward, where α11 is the movable angle of the first hinge plate 362 and α12 is the movable range of the second hinge plate 364. The relationship α12=α22 is met When moving the tilt of the display unit 300 downward, where α12 is the movable angle of the first hinge plate 362 and α22 is the movable range of the second hinge plate 364.

Therefore, when moving the tilt of the display unit 300 upward or downward, the position at where the tilt is locked is the same position in both the first hinge plate 362 and the second hinge plate 364. Thus, the tilt position can be simultaneously locked at both ends of the shaft 366, where twist is reliably suppressed from occurring between the display unit 300 and the shaft 366 when the tilt position is locked. Therefore, the upper side of the display unit 300 can be suppressed from inclining with respect to the center axis of the shaft 366 at the lock position, and a smooth movement of the display unit 300 can be realized.

Figure 18A:
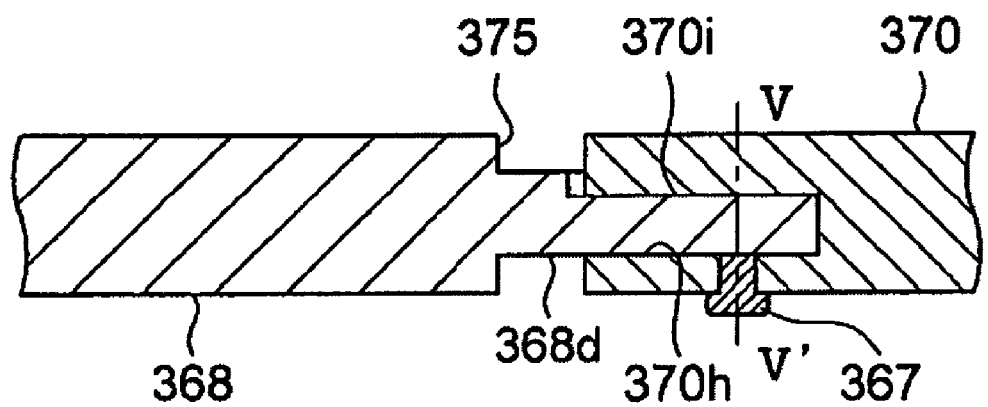
FIGS. 18A and 18B are frame format views showing another example of a configuration of a shaft.
Figure 18B:
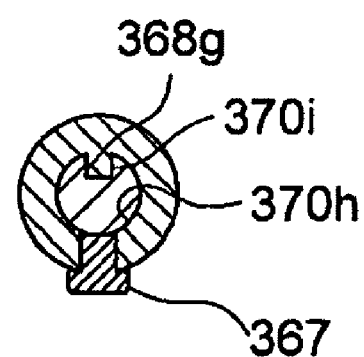

FIGS. 18A and 18B are frame format views showing another example of a configuration of connecting the shaft 368 and the shaft 370. FIG. 18A is a cross section taken along the center axis of the shaft 366. FIG. 18B is a frame format view showing a cross section taken along a chain dashed line V-V' in FIG. 18A. In the example of FIGS. 18A and 18B, the engagement shaft 368d of the shaft 368 is inserted to a hole 370h of the shaft 370, and a key 370i of the hole 370h and the key groove 368g of the engagement shaft 368d are engaged to regulate the angular position of the shaft 368 and the shaft 370. The shaft 368 and the shaft 370 are configured so that the shaft 368 does not slip out from the shaft 370 by caulking the fixing caulking pin 367 to the shaft 370. In such configuration as well, the angular positions of the engagement groove 368f of the shaft 368 and the engagement groove 370f of the shaft 370 can be regulated, and the position at where the tilt position is locked becomes the same in both the first hinge plate 362 and the second hinge plate 364.

[Substrate Wiring Structure of Display Unit]

Figure 19:
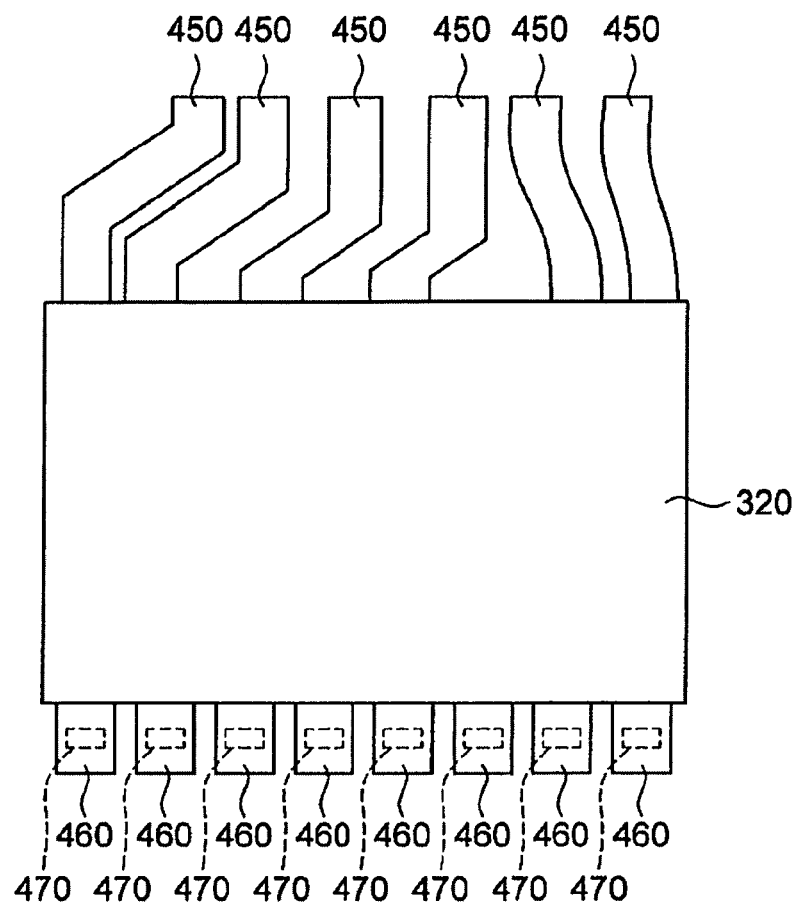
FIG. 19 is a frame format view showing a state in which a flexible print substrate and an organic EL panel are connected.

FIG. 19 is a frame format view showing a state in which the flexible print substrates 450, 460 for connecting the organic EL panel 320 and the T-substrate 350 are connected with the organic EL panel 320. As shown in FIG. 19, the flexible print substrate 450 arranged with a power supply line is connected to the upper end of the organic EL panel 320. The flexible print substrate 460 arranged with a signal line is connected to the lower end of the organic EL panel 320. A driver IC 470 is mounted on the flexible print substrate 460. The driver IC 470 is a driver IC for transmitting a control signal to light emit each organic EL element of the organic EL panel 320.

Figure 20:
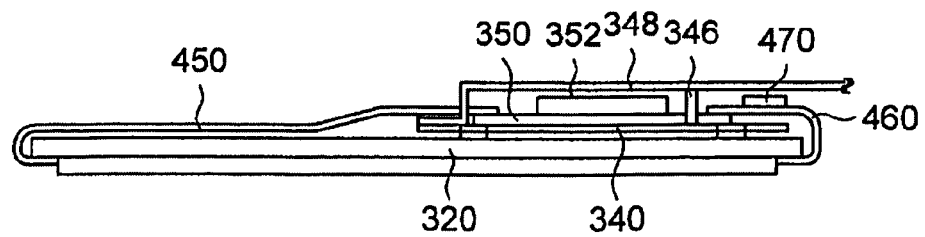
FIG. 20 is a frame format view showing a state in which the configuration of FIG. 19 is incorporated in the display unit.

FIG. 20 is a frame format view showing a state in which the configuration of FIG. 19 is incorporated in the display unit 300, and shows a state of the organic EL panel 320, the base plate 340, the T-substrate 350, and the flexible print substrates 450, 460 seen from the side surface of the display unit 300.

As shown in FIG. 20, the flexible print substrate 450 pulled out from the upper end of the organic EL panel 320 is folded back 180° and connected to the T-substrate 350. The flexible print substrate 460 pulled out from the lower end of the organic EL panel 320 is folded back 180° and connected to the T-substrate 350. Therefore, the T-substrate 350 need not arranged on the entire surface of the organic EL panel 320 at the rear surface of the organic EL panel 320, and the occupying region of the T-substrate 350 can be suppressed to a minimum.

Therefore, the T-substrate 350 can be arranged in a minimum range at the lower part of the organic EL panel 320, and in particular, the thickness of the display unit 300 can be suppressed to a minimum at the region of the upper part of the T-substrate 350. The thickness of the display unit 300 is mainly regulated by the organic EL panel 320, the graphite sheet 330, and the rear cover 420 in the region not arranged with the T-substrate 350, and thus the thickness of the display unit 300 can be made very thin to about 3 mm as described above, and the display unit 300 excelling in airiness and floating feeling can be configured.

The organic EL panel 320 and the T-substrate 350 can be electrically connected without widening the outer shape of the organic EL panel 320 by connecting the flexible print substrates 450, 460 pulled out from the T-substrate 350 and folded back 180° to the organic EL panel 320. Therefore, according to the substrate wiring structure of the display unit 300 of the present embodiment, the size of the display unit 300 can be suppressed to a minimum, and the display unit 300 can be miniaturized.

FIG. 20 also shows a state in which the base plate 340 and a supporting member 348 (first hinge plate 362 and second hinge plate 364) for supporting the base plate 340 are coupled. The base plate 340 is adhered and coupled to at least one part of the supporting member 348 or is coupled with the supporting member 348 by way of a fixing part 346. As described above, the base plate 340 is coupled to the first hinge plate 362 and the second hinge plate 364 serving as the supporting member 348, but the supporting member 348 shown in FIG. 20 may act as a configuring member such as a stand arm arranged upright from the body unit if a tilt adjustment mechanism is not arranged in the display unit 300. In this case as well, the main members configuring the display unit 300 such as the base plate 340 and the T-substrate 350 are arranged at the lower part of the display unit 300 in a concentrated manner, and the thickness on the upper side of the display unit 300, in particular, can be suppressed to a minimum.

[Heat Radiation Structure by Hinge]

The heat radiation structure by the hinge of the present embodiment will be specifically described.

Figure 21:
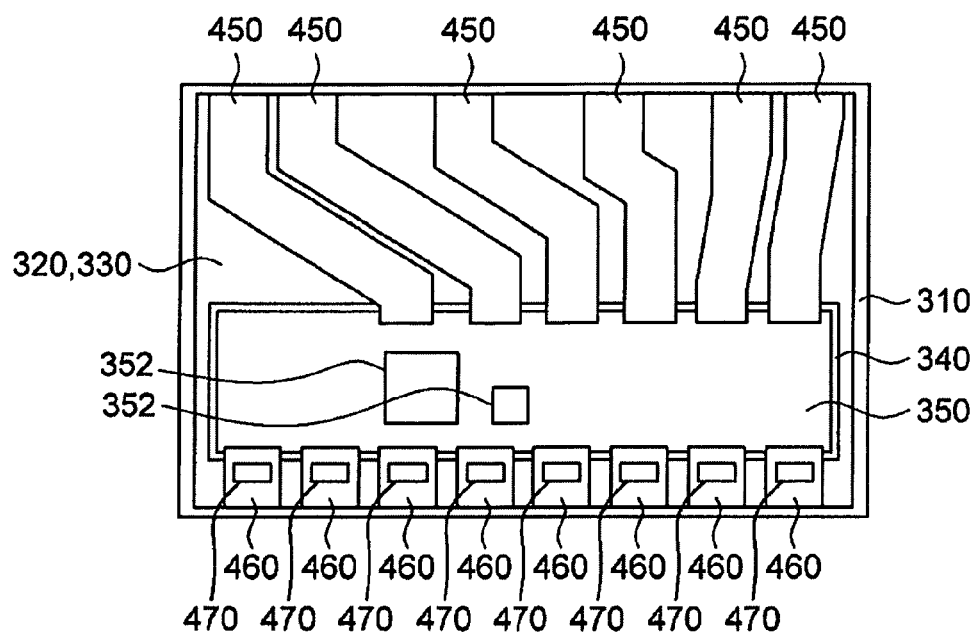
FIG. 21 is a frame format view showing a state of FIG. 20 seen from the rear surface side of the display unit.
Figure 22:
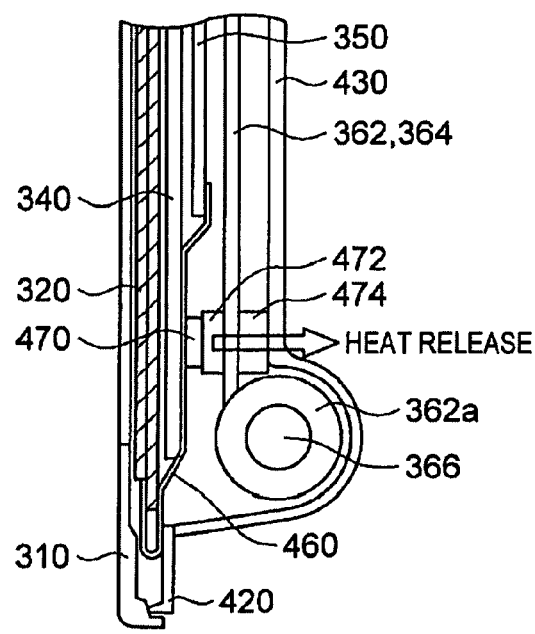
FIG. 22 is a frame format view showing a cross section near the shaft of the display unit.
Figure 23:
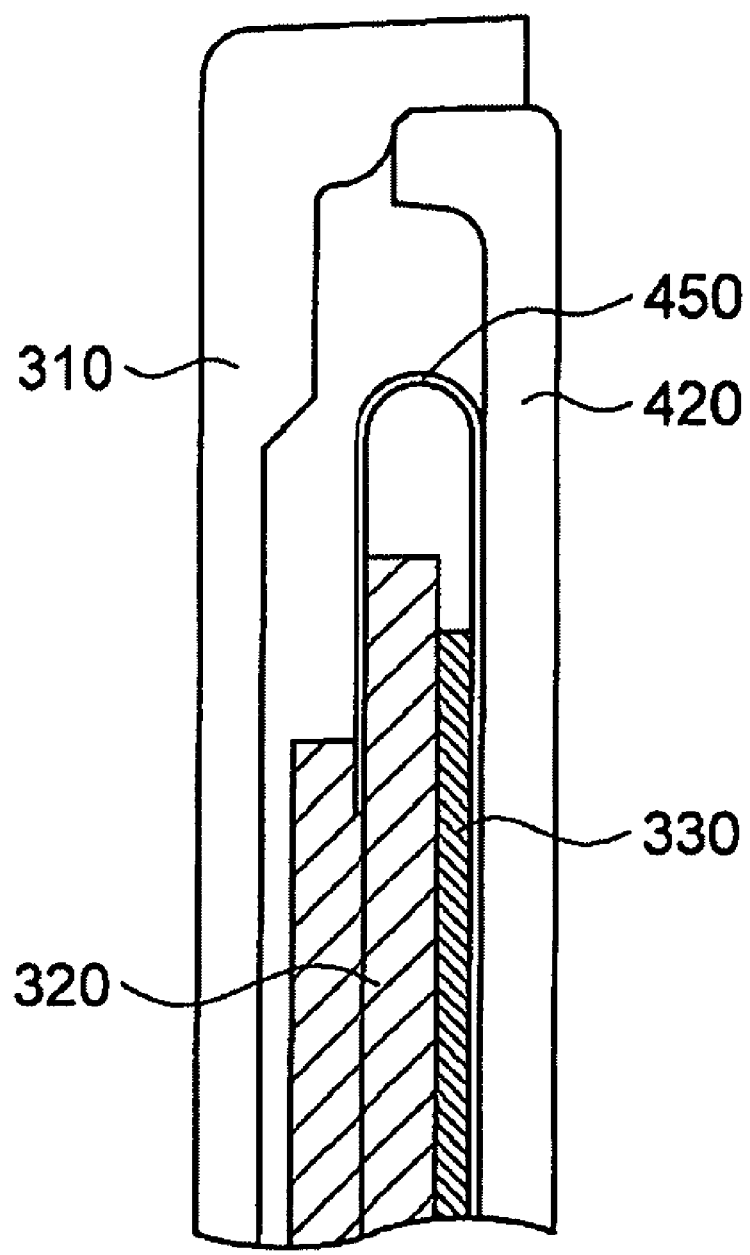
FIG. 23 is a frame format view showing a cross sectional configuration of the upper part of the display unit.

FIG. 21 is a frame format view showing a state seen from the rear surface side of the display unit 300 in which the organic EL panel 320 (display panel) configuring the display unit 300, the T-substrate 350 (substrate), and the flexible print substrates 450, 460 are incorporated in the display unit 300. FIGS. 22 and 23 are frame format views showing a cross section of the lower part and a cross section of an upper part, respectively, of the display unit 300.

As shown in FIG. 21 and FIG. 22, the organic EL panel 320 and the graphite sheet 330 are arranged on the rear surface of the bezel 310, and the base plate 340 and the T-substrate 350 are arranged at the lower part of the rear surface thereof. The electronic component 352 is mounted on the T-substrate 350. As shown in FIG. 6, the first hinge plate 362 and the second hinge plate 364 of the hinge 360 are arranged on the rear surface of the T-substrate 350, and the T-cover 430 is arranged on the rear surface thereof. The rear cover 420 is arranged on the upper part of the rear surface of the display unit 300. The T-cover 430 and the rear cover 420 have at least one part thereof configured by a metal member to enhance heat radiation efficiency of the display unit 300.

As described above, the upper end of the T-substrate 350 is connected to the upper end of the organic EL panel 320 by way of the flexible print substrate 450 wired with the power supply line, and the lower end of the T-substrate 350 is connected to the lower end of the organic EL panel 320 by way of the flexible print substrate 460 wired with the signal line.

In the display device 1000 according to the present embodiment, the display unit 300 becomes thinner by stacking and arranging the configuring members in a concentrated manner at the lower part of the rear surface of the display unit 300 as opposed to arranging them at the upper part of the display unit 300, as shown in FIG. 22. Thus, during the operation of the display device 1000, the heat generates inside the display unit 300 with the organic EL panel 320, the T-substrate 350, the electronic component 352, and the driver IC 470 as the main heat generating sources.

Some of the heat generated inside the display unit 300 is conducted to the arm unit 200 and the body unit 100 through the hinge 360 and released, and the rest of the heat raises the temperature of the internal space formed between the organic EL panel 320 and the rear cover 420. Thus, the heat inside the display unit 300 need to be appropriately released towards the outside of the display unit 300 to maintain an appropriate operation environment of the display unit 300.

The heat radiation structure according to the present embodiment includes the first hinge plate 362 and the second hinge plate 364 arranged on the rear surface of the T-substrate 350. As shown in FIG. 11, the T-substrate 350 is arranged between the first hinge plate 362 and the second hinge plate 364, and the base plate 340. The first hinge plate 362 and the second hinge plate 364 are arranged on the rear surface of the T-substrate 350 so as to cover at least one part of the T-substrate 350 and the electronic component 352. The first hinge plate 362 and the second hinge plate 364 have at least one part thereof configured by a metal member to support the organic EL panel 320 by way of the base plate 340 and to diffuse the heat inside the display unit 300 to the outside, in particular, to the rear surface side of the display unit 300.

According to such configuration, the heat inside the display unit 300, in particular, the heat generated from the T-substrate 350 or the electronic component 352 which are main heat generating sources is transferred to the side of the first hinge plate 362 and the second hinge plate 364 having high heat conductivity, and diffused at the surface of the first hinge plate 362 and the second hinge plate 364. The heat generated from the T-substrate 350 or the electronic component 352 thus can be efficiently released towards the rear surface side of the display unit 300 through the T-cover 430.

The heat transfer from the T-substrate 350 or the electronic component 352 to the first hinge plate 362 and the second hinge plate 364 may be carried out by heat radiation, or may be carried out through a heat conductive member such as heat radiation sheet arranged to simultaneously contact both members.

As shown in FIG. 22, the driver IC 470 mounted on the flexible print substrate 460 is arranged proximate to the coupling part of the first hinge plate 362 and the second hinge plate 364, and the shaft 366 at the lower side of the T-substrate 350. A heat radiation sheet 472 (heat conductive member) including, for example, graphite material is interposed between the driver IC 470 and the first hinge plate 362 and the second hinge plate 364 to simultaneously contact both members. A heat radiation sheet 474 (heat conductive member) is also interposed between the first hinge plate 362 and the second hinge plate 364, and the T-cover 430 to simultaneously contact both members.

According to such configuration, the heat generated from the driver IC 470 serving as the main heat generating source is transferred to the T-cover 430 through the first hinge plate 362 and the second hinge plate 364 by heat conduction or heat radiation through the heat radiation sheets 472, 474. The heat generated from the driver IC 470 can be thereby efficiently released towards the rear surface side of the display unit 300.

The driver IC 470 is arrayed along a horizontal direction of the display unit 300 to provide the control signal for driving each pixel arrayed in the vertical direction of the organic EL panel 320. The shaft 366 of the hinge 360 is also arranged extending in the horizontal direction of the display unit 300 to vary the tilt angle of the display unit 300. Thus, in the display device 1000 of the present embodiment, the arraying direction of the driver IC 470 and the extending direction of the shaft 366 of the hinge 360 can be coincided. The driver IC 470, and the first hinge plate 362 and the second hinge plate 364 can be arranged proximate to each other, and the heat generated from the driver IC 470 can be efficiently released towards the rear surface side of the display unit 300 through the first hinge plate 362 and the second hinge plate 364.

As shown in FIG. 23, the flexible print substrate 450 extending from the upper part of the T-substrate 350 is arranged between the organic EL panel 320 and the rear cover 420 at the upper part of the display unit 300. One part of the graphite sheet 330 having high heat radiation characteristic attached over the entire rear surface of the organic EL panel 320 is interposed between the organic EL panel 320 and the rear cover 420.

According to such configuration, the heat generated from the organic EL panel 320 is evenly diffused in the graphite sheet 330 and conducted to the rear cover 420. The heat generated from the organic EL panel 320 then can be efficiently radiated to the rear surface side of the display unit 300 from the rear cover 420.

As described above, according to the heat radiation structure of the present embodiment, the first hinge plate 362 and the second hinge plate 364 (hinge plate) are arranged for holding the organic EL panel 320 (display panel) and for releasing the heat generated from the T-substrate 350, the electronic component 352 or the driver IC 470, at the rear surface of the T-substrate 350 (substrate) or the driver IC 470. The first hinge plate 362 and the second hinge plate 364 are arranged so as to cover the T-substrate 350, the electronic component 352, or the driver IC 470 serving as heat generating sources. The heat generated from the T-substrate 350, the electronic component 352, or the driver IC 470 is thereby conducted to the first hinge plate 362 and the second hinge plate 364, and diffused at the surface of the first hinge plate 362 and the second hinge plate 364. The heat inside the display unit 300 can be thereby efficiently released towards the rear surface side of the display unit 300, and as a result, the heat radiation efficiency of the display unit 300 can be enhanced.

It should be understood by those skilled in the art that various modifications, combinations, sub-combinations and alterations may occur depending on design requirements and other factors insofar as they are within the scope of the appended claims or the equivalents thereof.

For instance, in the embodiment described above, a case of releasing the heat generated inside the display unit 300 to the rear surface side of the display unit 300 has been described. However, the embodiment of the present invention is similarly applicable to a case of releasing some of the heat generated inside the display unit 300 to the rear surface side and the front surface side of the display unit 300. To this end, for example, the bezel 310 to be attached to the front surface of the organic EL panel 320 (display panel) is made of material having high heat radiation characteristics, and a heat conductive member for promoting heat conduction between the bezel 310 and the heat generating source may be arranged. The heat inside the display unit 300 is thereby released towards the rear surface side and the front, surface side of the display unit 300, whereby the heat radiation efficiency of the entire display unit 300 can be enhanced.

In the above embodiment, a case where a characteristic heat radiating structure is applied to the embodiment of the present invention has been described with respect to the display device 1000 including the organic EL panel 320 serving as one example of the display panel. However, the embodiment of the present invention is not limited thereto and can be similarly applicable to display devices including other types of display panel such as liquid crystal panel.

What is claimed is:

1. A display device comprising:
    a display panel;
    a substrate arranged at a lower part of a rear surface of the display panel, and mounted with an electronic component for functioning the display panel;
    hinge plates, arranged at a rear surface of the substrate so as to cover at least one part of the substrate or the electronic component, for holding the display panel and diffusing heat of the substrate or the electronic component; and
    a supporting shaft arranged extending at a lower part of the display panel and turnably coupled with the hinge plates with respect to a center axis.

2. The display device according to claim 1, wherein the substrate or the electronic component and the hinge plates contact through a heat conductive member.

3. The display device according to claim 1, wherein a metal rear cover is attached to rear surfaces of the hinge plates.

4. The display device according to claim 3, wherein the hinge plates and the rear cover contact through a heat conductive member.

5. The display device according to claim 1, wherein
    the electronic component is a driver IC for providing a drive signal to the display panel; and
    the driver IC is arranged along the supporting shaft extending at the lower part of the display panel.

* * * * *